United States Patent
Han et al.

(10) Patent No.: US 9,178,609 B2
(45) Date of Patent: Nov. 3, 2015

(54) METHOD OF GENERATING CODE SEQUENCE AND METHOD OF TRANSMITTING SIGNAL USING THE SAME

(71) Applicant: LG ELECTRONICS INC., Seoul (KR)

(72) Inventors: Seung Hee Han, Seoul (KR); Min Seok Noh, Seoul (KR); Yeong Hyeon Kwon, Gyeonggi-do (KR); Young Woo Yun, Seoul (KR); Hyun Hwa Park, Gyeonggi-do (KR); Hyun Woo Lee, Gyeonggi-do (KR); Dong Cheol Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 13/775,076

(22) Filed: Feb. 22, 2013

(65) Prior Publication Data

US 2013/0170485 A1 Jul. 4, 2013

Related U.S. Application Data

(63) Continuation of application No. 13/033,498, filed on Feb. 23, 2011, now Pat. No. 8,830,983, which is a continuation of application No. 12/158,657, filed as (Continued)

(30) Foreign Application Priority Data

Dec. 20, 2005 (KR) ........................ 10-2005-0126307
Aug. 25, 2006 (KR) ........................ 10-2006-0081035
Dec. 20, 2006 (KR) ........................ 10-2006-0130507

(51) Int. Cl.
*H04J 11/00* (2006.01)
*H04B 7/26* (2006.01)

(Continued)

(52) U.S. Cl.
CPC .......... *H04B 7/2628* (2013.01); *H04L 27/3483* (2013.01); *H04W 56/001* (2013.01)

(58) Field of Classification Search
CPC ..... H04L 5/0007; H04L 27/206; H04J 11/00; H04J 13/18; H04J 13/12; H04J 13/0048; H04B 7/2628
USPC ........................................ 370/203, 208, 209
See application file for complete search history.

(56) References Cited

U.S. PATENT DOCUMENTS 6,775,318 B2   8/2004   Chen et al.
6,888,880 B2   5/2005   Lee et al.

(Continued)

FOREIGN PATENT DOCUMENTS

CN   1286548   3/2001
CN   1292631   4/2001

(Continued)

OTHER PUBLICATIONS

U.S. Appl. No. 13/033,498, Notice of Allowance dated May 30, 2014, 6 pages.

(Continued)

*Primary Examiner* — Brenda H Pham
(74) *Attorney, Agent, or Firm* — Lee, Hong, Degerman, Kang & Waimey

(57) ABSTRACT

A method of generating a code sequence and method of adding additional information using the same are disclosed, by which a code sequence usable for a channel for synchronization is generated and by which a synchronization channel is established using the generated sequence. The present invention, in which the additional information is added to a cell common sequence for time synchronization and frequency synchronization, includes the steps of generating the sequence repeated in time domain as many as a specific count, masking the sequence using a code corresponding to the additional information to be added, and transmitting a signal including the masked sequence to a receiving end.

10 Claims, 39 Drawing Sheets

Related U.S. Application Data application No. PCT/KR2006/005598 on Dec. 20, 2006, now Pat. No. 7,916,759.

(60) Provisional application No. 60/828,759, filed on Oct. 9, 2006, provisional application No. 60/847,780, filed on Sep. 27, 2006, provisional application No. 60/827,022, filed on Sep. 26, 2006.

(51) Int. Cl.
*H04W 56/00* (2009.01)
*H04L 27/34* (2006.01)

(56) References Cited

U.S. PATENT DOCUMENTS

| | | | |
|---|---|---|---|
| 7,336,600 | B2 | 2/2008 | Feng et al. |
| 7,583,981 | B2 | 9/2009 | Suzuki |
| 7,907,592 | B2 | 3/2011 | Han et al. |
| 7,907,906 | B2 | 3/2011 | Murata et al. |
| 2002/0048315 | A1 | 4/2002 | Hanada et al. |
| 2002/0064211 | A1 | 5/2002 | Chen et al. |
| 2003/0152178 | A1 | 8/2003 | Tanno et al. |
| 2004/0141458 | A1 | 7/2004 | Park et al. |
| 2004/0170121 | A1* | 9/2004 | Kim et al. ............ 370/208 |
| 2005/0111522 | A1 | 5/2005 | Sung et al. |
| 2005/0201475 | A1 | 9/2005 | Alcouffe |
| 2006/0035664 | A1 | 2/2006 | Murata et al. |
| 2006/0050799 | A1 | 3/2006 | Hou et al. |
| 2007/0140106 | A1 | 6/2007 | Tsai et al. |
| 2007/0183306 | A1 | 8/2007 | Akita et al. |
| 2007/0183386 | A1* | 8/2007 | Muharemovic et al. ...... 370/344 |
| 2007/0270273 | A1 | 11/2007 | Fukuta et al. |
| 2008/0013516 | A1 | 1/2008 | Zhang et al. |
| 2009/0268695 | A1* | 10/2009 | Zhao et al. ............ 370/336 |
| 2009/0323642 | A1 | 12/2009 | Tanno et al. |
| 2011/0188465 | A1 | 8/2011 | Han et al. |

FOREIGN PATENT DOCUMENTS

| | | |
|---|---|---|
| CN | 1350380 | 5/2002 |
| CN | 1486098 | 3/2004 |
| CN | 1658534 | 8/2005 |
| EP | 0245868 | 11/1987 |
| EP | 1199820 | 4/2002 |
| EP | 1401114 | 3/2004 |
| JP | 1-151335 | 6/1989 |
| JP | 7-170210 | 7/1995 |
| JP | 9-098153 | 4/1997 |
| JP | 2002-135167 | 5/2002 |
| KR | 10-0342520 | 6/2002 |
| KR | 1020020096833 | 12/2002 |
| KR | 10-2003-0035843 | 5/2003 |
| KR | 10-2004-0045996 | 6/2004 |
| KR | 1020050082655 | 8/2005 |
| KR | 10-2006-0044805 | 5/2006 |
| WO | 2007/066973 | 6/2007 |
| WO | 2007/073093 | 6/2007 |

OTHER PUBLICATIONS

European Patent Office Application Serial No. 07833032.1, Search Report dated Feb. 7, 2014, 10 pages.
U.S. Appl. No. 13/033,498, Office Action dated Feb. 5, 2014, 7 pages.
Bahl, S.K.; et al.: "Comparison of initial cell search algorithms for W-CDMA systems using cyclic and comma free codes." Conference proceedings of the 2002 45th Midwest Symposium Circuits and Systems, vol. 1, pp. 192-195, Aug. 4, 2002.
Korean Intellectual Property Office Application Serial No. 10-2006-0081035, Notice of Allowance dated Feb. 28, 2013, 2 pages.
The State Intellectual Property Office of the People's Republic of China Application Serial No. 201110412669.8, Office Action dated Mar. 17, 2014, 6 pages.
Korean Intellectual Property Office Application Serial No. 10-2007-0080297, Notice of Allowance dated Sep. 25, 2013, 2 pages.

\* cited by examiner

FIG. 7
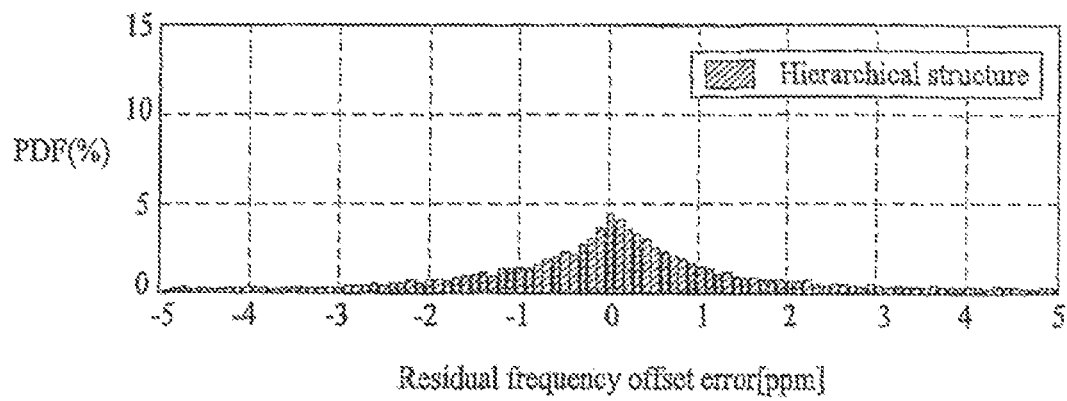
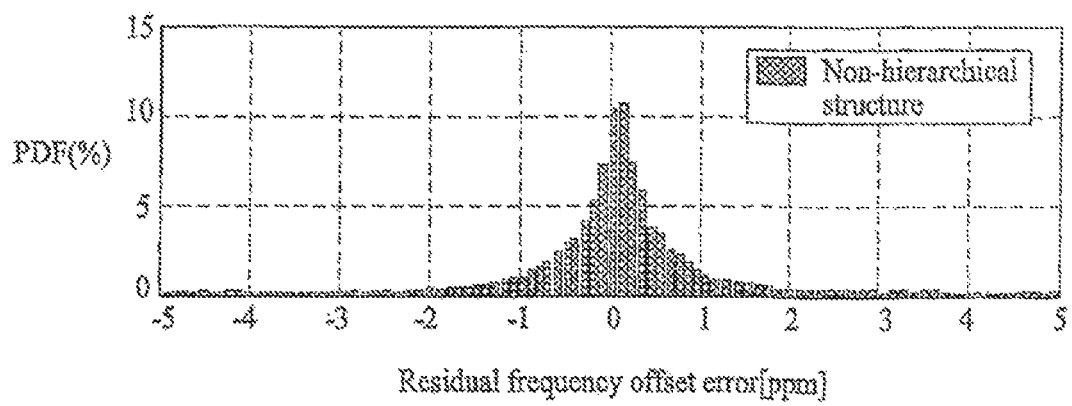

FIG. 13
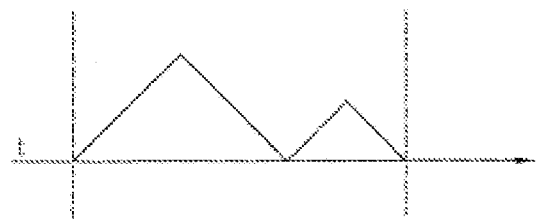
(a)
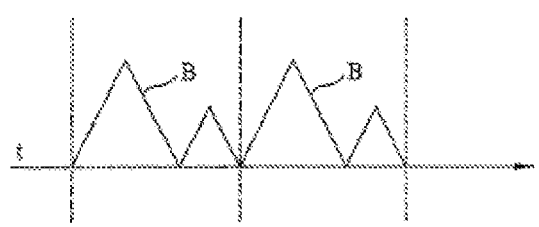
(b)
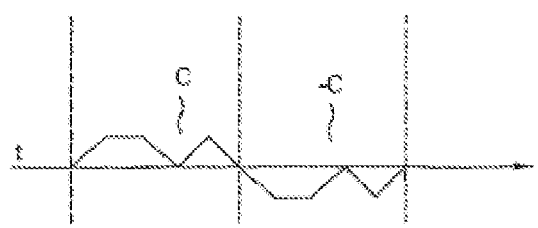
(c)

METHOD OF GENERATING CODE SEQUENCE AND METHOD OF TRANSMITTING SIGNAL USING THE SAME

CROSS-REFERENCE TO RELATED APPLICATIONS

This application is a continuation of U.S. patent application Ser. No. 13/033,498, filed on Feb. 23, 2011, now U.S. Pat. No. 8,830,983, which is a continuation of U.S. patent application Ser. No. 12/158,657, filed on Oct. 28, 2008, now U.S. Pat. No. 7,916,759, which is the National Stage filing under 35 U.S.C. §371 of International Application No. PCT/KR2006/005598, filed on Dec. 20, 2006, which claims the benefit of earlier filing date and right of priority to Korean Application Nos. 10-2006-0130507, filed on Dec. 20, 2006, 10-2006-0081035, filed on Aug. 25, 2006, and 10-2005-0126307, filed on, Dec. 20, 2005, and also claims the benefit of U.S. Provisional Application Serial Nos. 60/828,759, filed on Oct. 9, 2006, 60/847,780, filed on Sep. 27, 2006, and 60/827,022, filed on Sep. 26, 2006, the contents of which are all hereby incorporated by reference herein in entirety.

TECHNICAL FIELD

The present invention relates to a synchronization associated channel, and more particularly, to a method of generating a code sequence and method of adding additional information using the same. Although the present invention is suitable for a wide scope of applications, it is particularly suitable for generating a code sequence usable for a channel for synchronization and configuring a synchronization channel using the generated sequence.

BACKGROUND ART

First of all, a synchronization channel (hereinafter abbreviated SCH) as an example of a specific channel is explained as follows.

In order for a user equipment to communicate with a base station in a mobile communication system, the user equipment primarily performs synchronization with the base station on SCH and then secondarily performs a cell search. A series of process for performing synchronization with a base station and obtaining an ID of a cell to which a user equipment belongs is called a cell search.

Generally, a cell search is classified into an initial cell search executed in case of a user equipment's 'power on' in an initial mode and a neighbor cell search performed by a user equipment in a connection mode (i.e., normal mode) or idle mode to search a neighbor base station.

FIG. 1 is a flowchart of a cell search procedure.

If the 3GPP LTE system is taken as an example among various communication systems, the SCH structure for the cell search is classified into a hierarchical structure and a non-hierarchical structure according to a time symbol synchronization and cell search method.

And, a cell ID obtaining method is classified into a first method of searching cell groups and searching reference signals for a final cell ID and a second method of obtaining a cell ID from SCH only.

In case of the first method, a cell group ID is obtained from SCH. In case of the second method, a final cell ID (i.e., cell ID) is obtained from SCH.

SCH following the hierarchical structure is explained as follows.

First of all, the SCH following the hierarchical structure is classified into a primary SCH (hereinafter abbreviated P-SCH) and a secondary SCH (S-SCH) like SCH of WCDMA.

The P-SCH is a channel on which all cells or sectors use the same signal and performs initial symbol synchronization and frequency synchronization. A signal value of P-SCH is already known by all user equipments. So, initial time symbol synchronization can be executed by performing cross-correlation between a received signal and a predetermined signal. Such a series of procedures are called cross-correlation based detection.

After time, symbol and frequency synchronizations have been obtained, cell ID or cell group ID detection is performed at a position of S-SCH previously indicated by timing synchronization information obtained from P-SCH.

Meanwhile, a method of multiplexing P-SCH and S-SCH can be classified into TDM, FDM and CDM.

FIG. 2 is a structural block diagram of SCH following a hierarchical structure.

An example shown in FIG. 2 corresponds to an example of multiplexing by TDM. Positions of P-SCH and S-SCH and a count of OFDM symbols including P-SCH and S-SCH may differ from the case shown in FIG. 2.

Referring to FIG. 2, SCH is generated via two OFDM symbols. A radio frame includes 20 sub frames, and a specific radio frame is selected to transmit SCH only.

In the example shown in FIG. 2, first and second OFDM symbol provide SCH. Yet, an OFDM symbol which provides SCH can be another OFDM symbol, e.g., a last OFDM symbol.

SCH following the non-hierarchical structure is explained as follows.

First of all, a non-hierarchical SCH is characterized in having a repetitive waveform within an OFDM symbol in time domain. This enables a user equipment to perform a blind detection of initial time symbol synchronization through auto-correlation of a received signal using the repetitive characteristic of signal. And, this detection is called auto-correlation based detection.

After completion of the time and frequency synchronizations, cell ID detection or cell group ID detection are carried out at a position of the detected SCH.

FIG. 3 is a structural block diagram of SCH following a non-hierarchical structure. An OFDM symbol or subframe to form SCH can be freely changed.

In the above-explained hierarchical structure, cross-correlation based detection can be carried out based on Formula 1.

$$\hat{d} = \underset{d}{\mathrm{argmax}}\{R(d) \mid 0 \leq d \leq N_f - 1\} \quad \text{[Formula 1]}$$

$$R(d) = \sum_{p=1}^{P}\sum_{q=1}^{Q}\left(\left(\sum_{m=1}^{M}\left|\sum_{n=(m-1)L}^{mL-1} S^*(n)r_{p,q}(n+d)\right|^2\right)\bigg/\left(\sum_{n=0}^{N-1}|r_{p,q}(n+d)|^2\right)\right)$$

$$(N = ML)$$

In Formula 1, 'R(d)' is a cost function to find a start point for synchronization acquisition, '$\hat{d}$' is a value to maximize the R(d), and '$N_f$' is a length of a radio frame. 'P' indicates a count of symbols used for averaging. 'Q' indicates a count of receiving antennas of a user equipment. 'L' indicates a count of Parts for M-partial correlation. 'N' indicates a point of FFT/DFT operation. '$r_{p,q}(n)$' indicates a signal received by a $q^{th}$ receiving antenna in a $p^{th}$ P-SCH symbol. And, 'S(n)' indicates a known sequence inserted in P-SCH. In this case, in the environment where frequency offset exists, if symbol synchronization via cross-correlation based detection is simply carried out, performance is degraded. So, M-partial correlation can be applied. [Y.-P. E. Wang and T. Ottosson, "Cell search in W-CDMA", Selected Areas in Communications, IEEE Journal on, vol. 18, pp. 1470-1482, August 2000.]

In the hierarchical structure shown in FIG. 2, a method of estimating frequency offset can be represented as Formula 2.

$$\Delta f = \frac{f_s}{\pi N}\arg\left\{-\sum_{p=1}^{P}\sum_{q=1}^{Q}\left[\sum_{n=0}^{N/2-1}(S^*(n)r_{p,q}(n+\hat{d}))\right]^*\left[\sum_{n=N/2}^{N-1}(S^*(n)r_{p,q}(n+\hat{d}))\right]\right\} \quad \text{[Formula 2]}$$

In Formula 2, '$f_s$' means a sampling frequency and 'arg{ }' means a phase component for a complex number. And, the frequency offset is generated from the difference between frequencies generated by oscillators provided to a base station and a user equipment, respectively.

And, the auto-correlation based detection used for the non-hierarchical structure shown in FIG. 3 is represented as Formula 3.

$$R(d) = \sum_{p=1}^{P}\sum_{q=1}^{Q}\left(\left|\sum_{n=0}^{N/2-1} r^*_{p,q}(n+d)r_{p,q}(n+d+N/2)\right|^2 \middle/ \sum_{n=0}^{N/2-1}(|r_{p,q}(n+d)|^2 + |r_{p,q}(n+d+N/2)|^2)\right) \quad \text{[Formula 3]}$$

And, the frequency offset can be estimated in the non-hierarchical structure in a following meaner of Formula 4.

$$\Delta f = \frac{f_s}{\pi N}\arg\left\{-\sum_{p=1}^{P}\sum_{q=1}^{Q}\sum_{n=0}^{\frac{N}{2}-1}[r_{p,q}(n+\hat{d})]^*\left[r_{p,q}\left(n+\hat{d}+\frac{N}{2}\right)\right]\right\} \quad \text{[Formula 4]}$$

The cell search method uses the same method for both of the hierarchical structure and the non-hierarchical structure.

Comparison between the hierarchical SCH and the non-hierarchical SCH is explained as follows.

First of all, communication systems are classified into a synchronous network and an asynchronous network. In particular, the synchronous network is a network having the same transmission start time for all sectors. Yet, in the asynchronous network, although sectors within one Node-B have the same transmission start time, a transmission start time is random between Node-Bs.

In case that both of the synchronous network and the asynchronous network need to be supported, the hierarchical SCH is preferably used.

FIG. 4 is a diagram of performance comparison between hierarchical SCH and non-hierarchical SCH in a synchronous system. And, FIG. 5 is a diagram of performance comparison between hierarchical SCH and non-hierarchical SCH in an asynchronous system.

Referring to FIG. 4 and FIG. 5, a case of using a hierarchical structure improves performance of cell search. Yet, in the hierarchical structure, cross-correlation detection should be used for timing synchronization acquisition and frequency offset estimation performance of the hierarchical structure is inferior to that of a non-hierarchical structure. FIG. 6 is a diagram of residual frequency offset error in a synchronous system, and FIG. 7 is a diagram of residual frequency offset error in an asynchronous system.

In brief, each of the hierarchical SCH and the non-hierarchical SCH has its own problems.

To solve these problems, the hybrid SCH scheme has been proposed. In the hybrid SCH scheme the hierarchical SCH and the non-hierarchical SCH are combined together.

FIG. 8 is a diagram to explain a hybrid SCH scheme.

Referring to FIG. 8, a hybrid SCH includes P-SCH and S-SCH like the hierarchical SCH. Yet, P-SCH is assigned to a frequency index with a specific interval in a specific OFDM symbol. In other words, a sequence included in P-SCH is configured in a manner that a specific waveform is repeated in time domain by a prescribed count.

Meanwhile, S-SCH is configured in a same manner of the hierarchical SCH.

In case of the hybrid SCH, P-SCH is configured by a cell common sequence. Yet, by allocating the respective sequences ($P_0$, $P_1$, $P_2$, . . . , $P_{N-2}$, $P_{N-1}$) corresponding to P-SCH to a frequency domain with a specific interval, cell search and frequency offset characteristics are enhanced.

Formula 5A shows a method of estimating a synchronization in a hybrid SCH and Formula 5B shows a method of estimating a frequency offset.

$$\hat{d} = \underset{d}{\operatorname{argmax}}\{R(d) \mid 0 \le d \le N_f - 1\} \quad \text{[Formula 5A]}$$

$$R(d) = \left(\sum_{m=0}^{M-1}\left|\sum_{m=mL}^{(m+1)L-1} p^*(n)r(d+n)\right|^2\right) \middle/ \left(\sum_{n=0}^{N_{fft}/2-1}|r(d+n)|^2\right) +$$

$$\left(\sum_{m=0}^{M-1}\left|\sum_{n=mL}^{(m+1)L-1} p^*\left(\frac{N_{fft}}{2}+n\right)r\left(\frac{N_{fft}}{2}+d+n\right)\right|^2\right) \middle/ \left(\sum_{n=0}^{N_{fft}/2-1}\left|r\left(\frac{N_{fft}}{2}+d+n\right)\right|^2\right)$$

$$(N_{fft}/2 = ML)$$

$$\hat{f} = \frac{N_{fft}}{2\pi N_{fft}/N_{rep}}\arg\left\{\sum_{n=0}^{N_{fft}/2-1}[r(\hat{d}+n)]^*[r(\hat{d}+n+N_{fft}/2)]\right\} \quad \text{[Formula 5B]}$$

DISCLOSURE OF THE INVENTION

Accordingly, the present invention is directed to a method of generating a code sequence and method of adding additional information using the same that substantially obviate one or more of the problems due to limitations and disadvantages of the related art.

An object of the present invention is to provide a method of generating a synchronization channel carrying additional information.

Another object of the present invention is to provide a method of generating a sequence for a synchronization channel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of adding additional information to a sequence for synchronization, in which the additional information is added to a cell common sequence for time synchronization and frequency synchronization, according to the present invention includes the steps of generating the sequence repeated in time domain as many as a specific count, masking the sequence using a code corresponding to the additional information to be added, and transmitting a signal including the masked sequence to a receiving end.

Preferably, the code includes either an orthogonal code or a quasi-orthogonal code.

Preferably, the code to be used in the masking step corresponds to the additional information by one-to-one.

Preferably, the masking step includes the step of multiplying the sequence by the code in the time domain.

Preferably, the sequence generating step includes the steps of allocating a sample included in the sequence to a frequency index with a constant interval in frequency domain, respectively and transforming a result of the allocating step into a time domain signal.

More preferably, the interval depends on the specific count.

Preferably, the masked sequence is transmitted on P-SCH (primary synchronization channel).

Preferably, the transmitting step includes the step of transmitting the signal using a plurality of orthogonal subcarriers.

Preferably, the additional information includes various kinds of information necessary for communications between nodes.

To further achieve these and other advantages and in accordance with the purpose of the present invention, a method of adding additional information to a sequence for synchronization, in which the additional information is added to a cell common sequence for time synchronization and frequency synchronization, includes the steps of allocating samples included in the sequence to a specific frequency index according to the additional information to be added and transmitting the sequence to a receiving end by transforming the sequence into a time domain signal.

Preferably, the allocating step includes the step of allocating the samples to the frequency index with a constant interval.

More preferably, the constant interval depends on a size of the additional information.

Preferably, the additional information includes various kinds of information necessary for communications between nodes.

To further achieve these and other advantages and in accordance with the purpose of the present invention, a method of adding additional information to a sequence for a synchronization channel includes the steps of generating the sequence for the synchronization channel, performing micro constellation modulation to rotate a phase of the sequence according to a phase value corresponding to the additional information to be added, and transmitting a signal including the micro-constellation-modulated sequence to a receiving end.

To further achieve these and other advantages and in accordance with the purpose of the present invention, a method of transmitting a signal, in which a transmitting side of a communication system performs data processing on a code sequence into a form requested by the communication system for at least one of initial synchronization acquisition, cell search and channel estimation and then transmits the data-processed signal to a receiving side of the communication system, includes the step of generating the code sequence by masking a repetitive code sequence with a specific orthogonal code, wherein the repetitive code sequence comprises at least twice repeated unit code sequences, each having a length L.

To further achieve these and other advantages and in accordance with the purpose of the present invention, a method of generating a code sequence, which is used for at least one use of initial synchronization acquisition, cell search and channel estimation, includes the steps of generating a unit code sequence set including unit code sequences, each having a length of L, by code generating algorithm according to a code type, generating a repetitive code sequence set including repetitive code sequences generated from repeating each of the unit code sequences belonging to the unit code sequence set twice at least, and masking each of the repetitive code sequences belonging to the repetitive code sequence set with a specific orthogonal code.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a diagram of residual frequency offset error in an asynchronous system;

FIG. 13 is a diagram to explain a method of allocating a specific sequence in frequency domain;

BEST MODE FOR CARRYING OUT THE INVENTION

Reference will now be made in detail to the preferred embodiments of the present invention, examples of which are illustrated in the accompanying drawings.

The present embodiment relates to synchronization channels. And, the synchronization channels can be classified into P-SCH and S-SCH. The present embodiment proposes a method of having additional information included in the synchronization channel. And, the present embodiment proposes a method of generating a sequence usable for the synchronization channel.

First of all, a method of having additional information included in a synchronization channel according to a first embodiment of the present invention is explained.

Secondly, a method of generating a sequence usable for a synchronization channel according to a first embodiment of the present invention is explained.

First Embodiment

In case of the aforesaid hierarchical SCH or hybrid SCH, P-SCH and S-SCH are used. And, the P-SCH is a cell common sequence. In particular, the P-SCH is provided by all base stations or sectors through a same sequence. In other words, the P-SCH is corresponding to the sequence already known to a user equipment and is used to acquire timing synchronization and frequency synchronization.

In case of the hierarchical or hybrid SCH, cell ID and other specific cell information can be obtained through S-SCH or various kinds of control channels, e.g., BCH, etc.

In the present embodiment, a method of adding additional information to a channel for synchronization such as P-SCH, S-SCH, hybrid SCH and the like.

The following method can be mainly divided into a method of adding additional information using masking by codes, a method of adding additional information using micro constellation modulation, and a method using both masking and micro constellation modulation.

First to third methods explained in the following description are examples of the method using masking by codes, which describes examples of adding additional information to P-SCH among synchronization channels. Since the method using masking by codes is applicable various synchronization channels, the following examples of P-SCH application are just exemplary. So, the present invention is not limited to the examples of the P-SCH application.

Despite the insertion of additional information into P-SCH according to the embodiment of the present invention, complexity according to synchronization estimation does not increase. And, the related art synchronization estimating method can be used as it is. Moreover, the inserted additional information of the present embodiment can be easily detected in various ways.

1. First Method

A first method according to the present embodiment includes the steps of generating P-SCH in time domain and inserting additional information.

In the first method, the P-SCH generating step and the additional information inserting step are preferably performed in the time domain.

Figure 1:
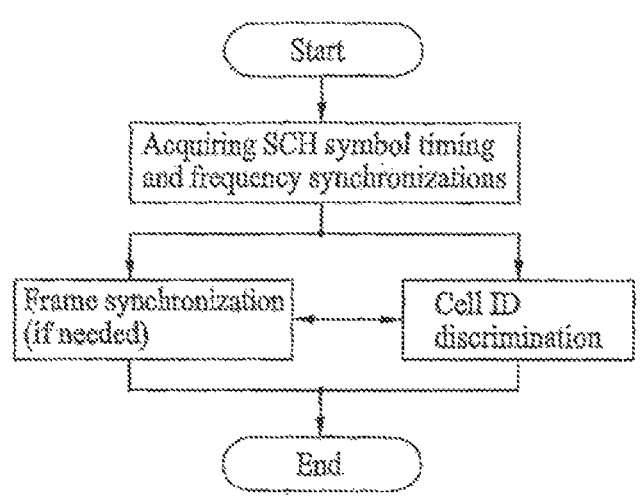
FIG. 1 is a flowchart of a cell search procedure.
Figure 2:
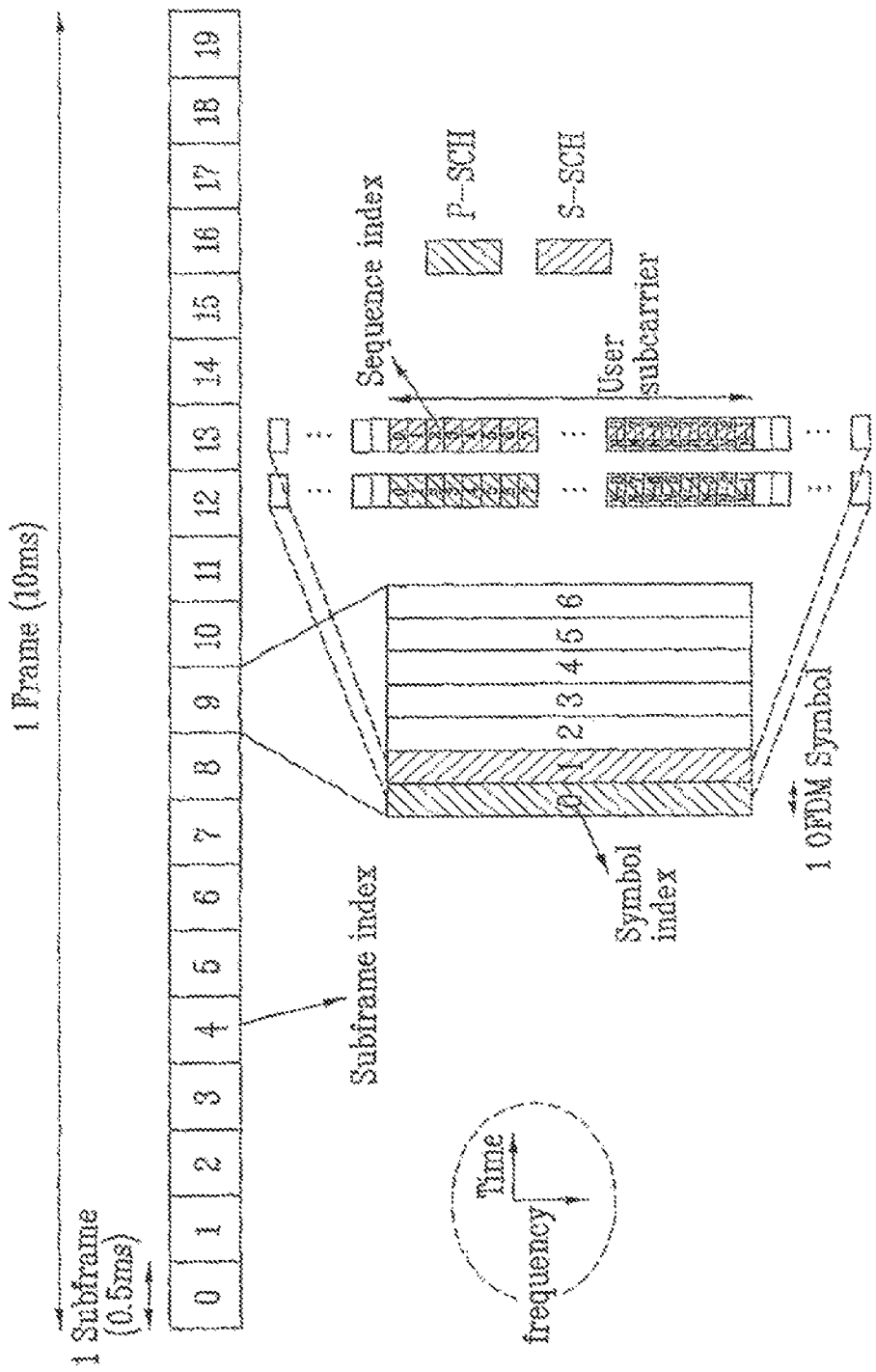
FIG. 2 is a structural block diagram of SCH following a hierarchical structure.
Figure 3:
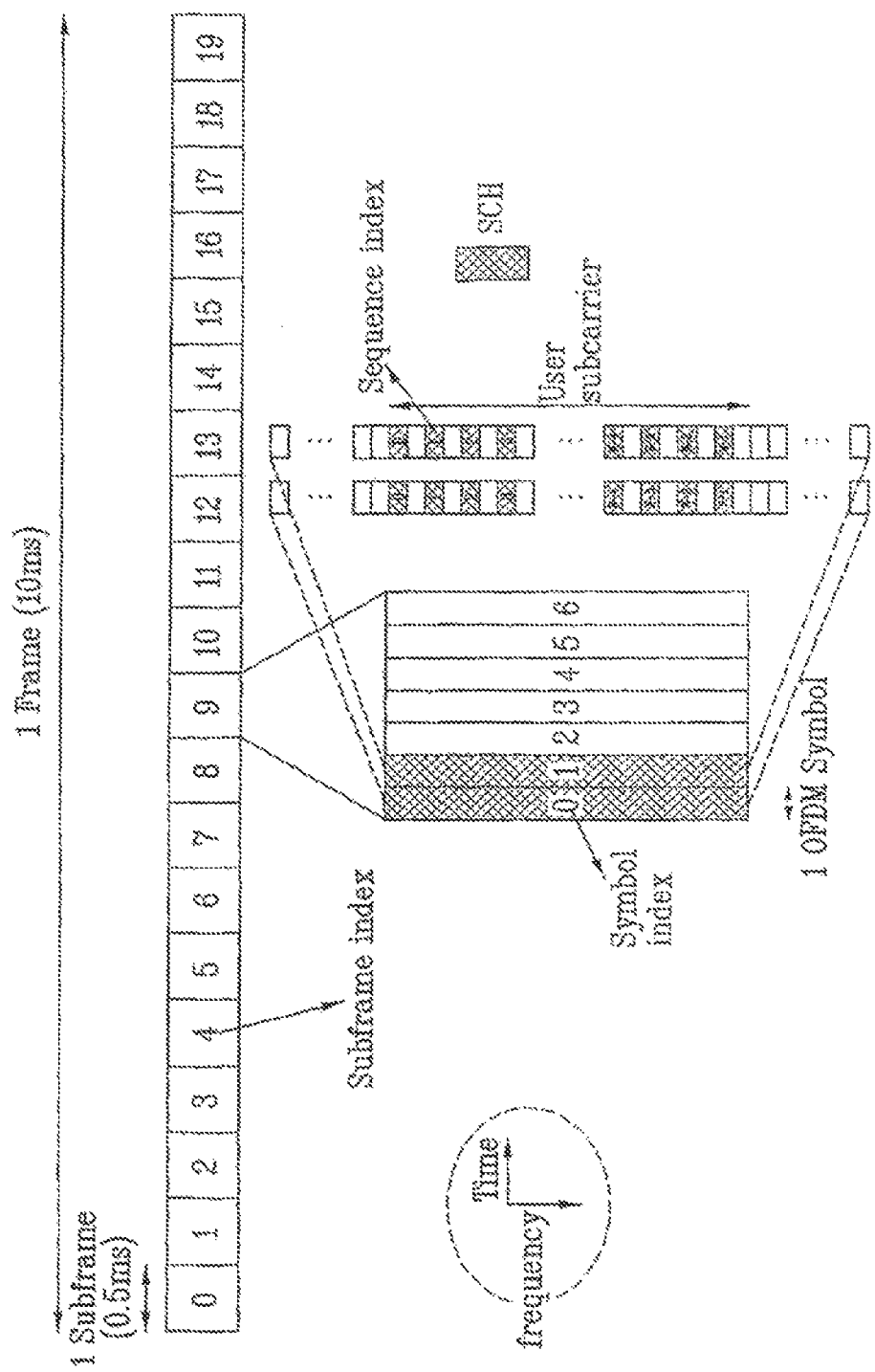
FIG. 3 is a structural block diagram of SCH following a non-hierarchical structure.
Figure 4:
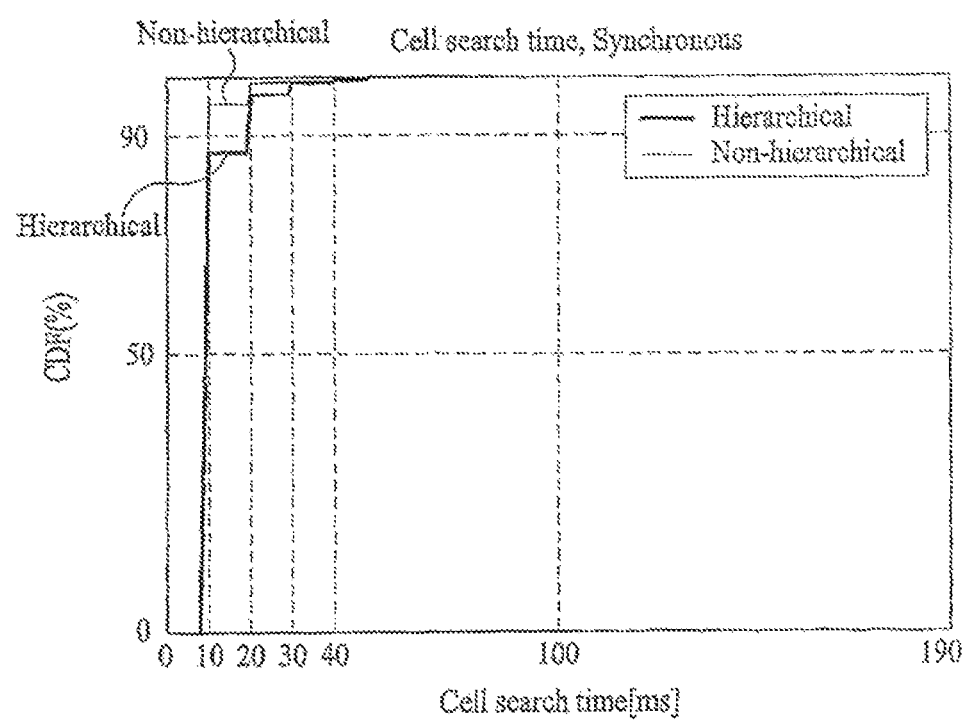
FIG. 4 is a diagram of performance comparison between hierarchical SCH and non-hierarchical SCH in a synchronous system.
Figure 5:
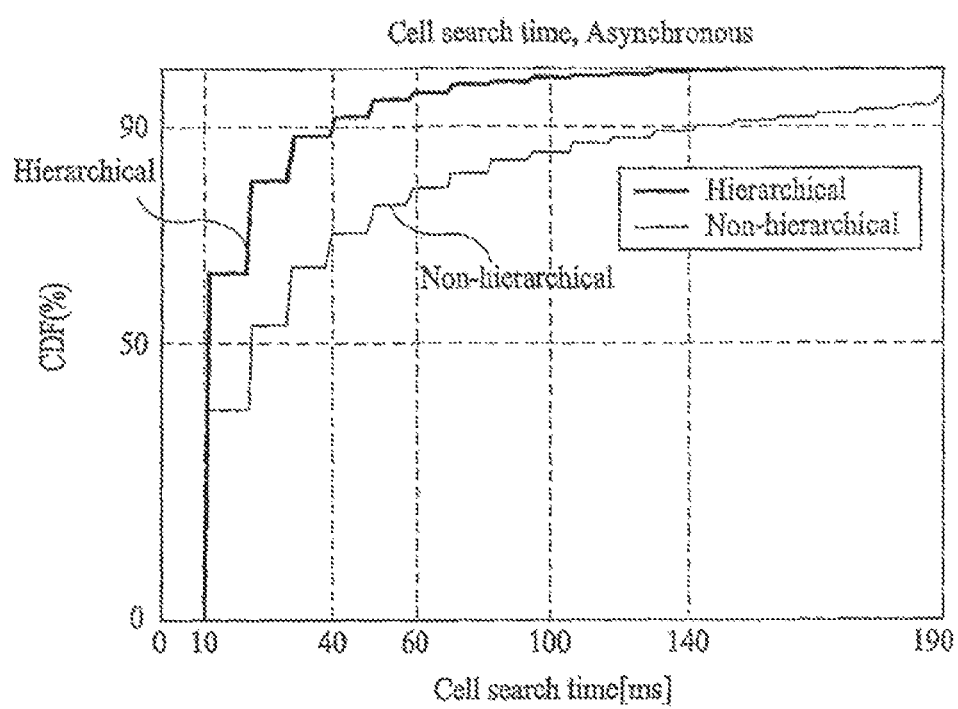
FIG. 5 is a diagram of performance comparison between hierarchical SCH and non-hierarchical SCH in an asynchronous system.
Figure 6:
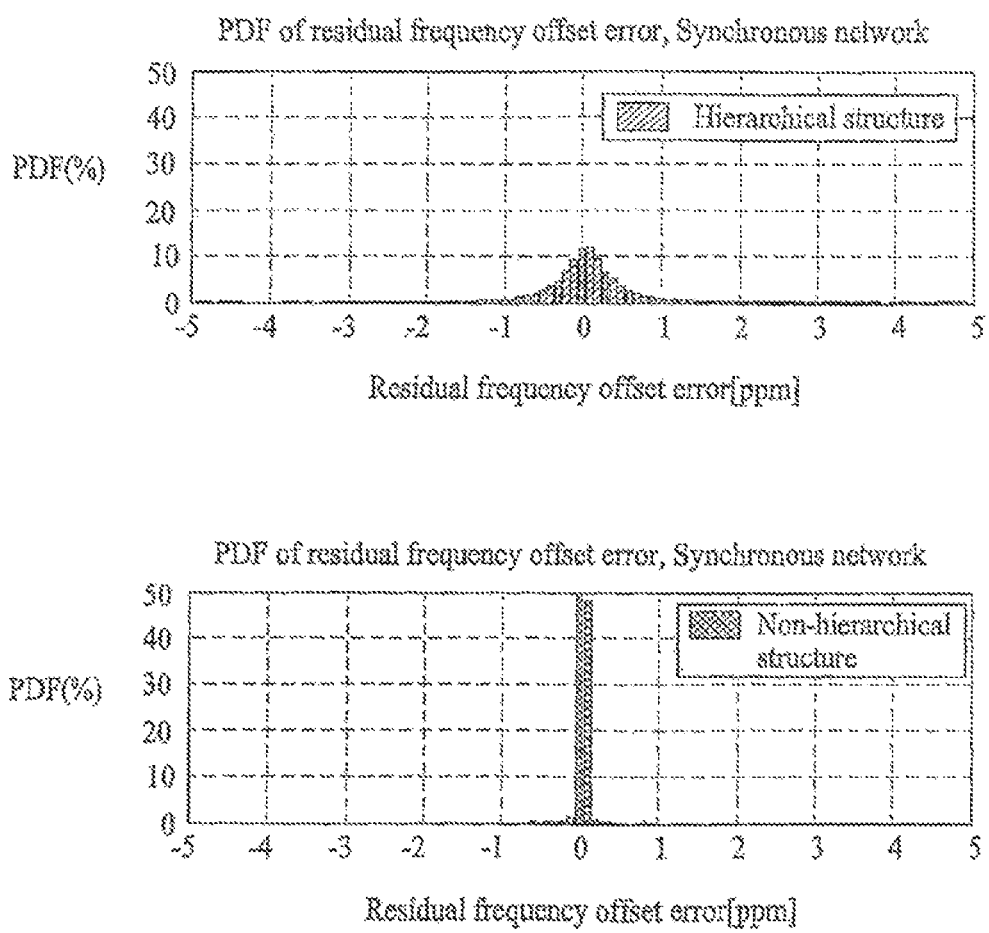
FIG. 6 is a diagram of residual frequency offset error in a synchronous system.
Figure 8:
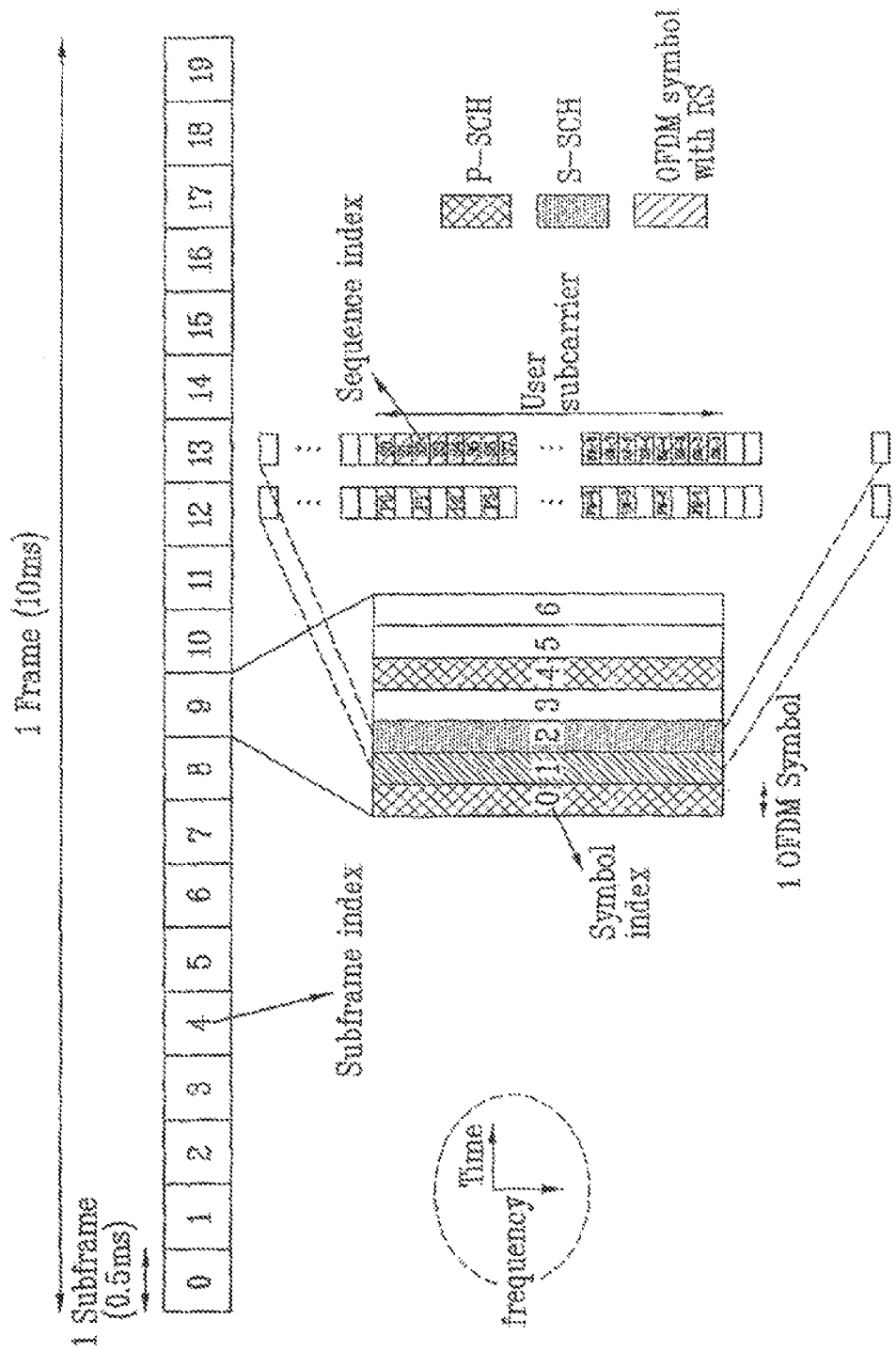
FIG. 8 is a diagram to explain a hybrid SCH scheme.
Figure 9:
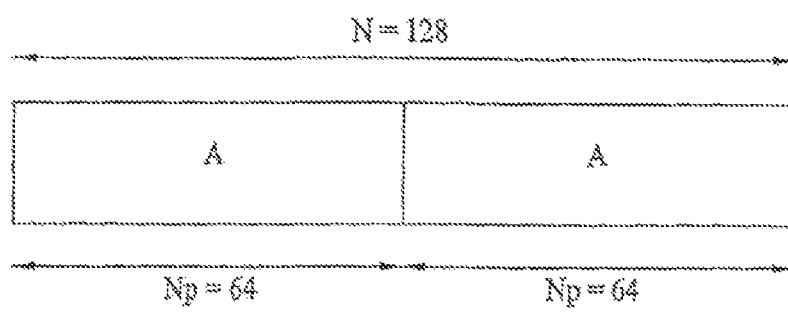
FIG. 9 is an exemplary block diagram of P-SCH inserted by the first method of the present embodiment.

FIG. 9 is an exemplary block diagram of P-SCH inserted by the first method of the present embodiment.

Referring to FIG. 9, it is able to assign P-SCH to 128 (=N) subcarriers. Preferably, P-SCH according to the present embodiment is generated in a manner that specific sequences (A) are repeated in time domain. The sequence (A) includes 64 samples $A_0$ to $A_{63}$. And, the 64 samples $A_0$ to $A_{63}$ are allocated to the subcarriers in frequency domain, respectively. FIG. 9 shows that two sequences (A) are repeated in the time domain.

Figure 10:
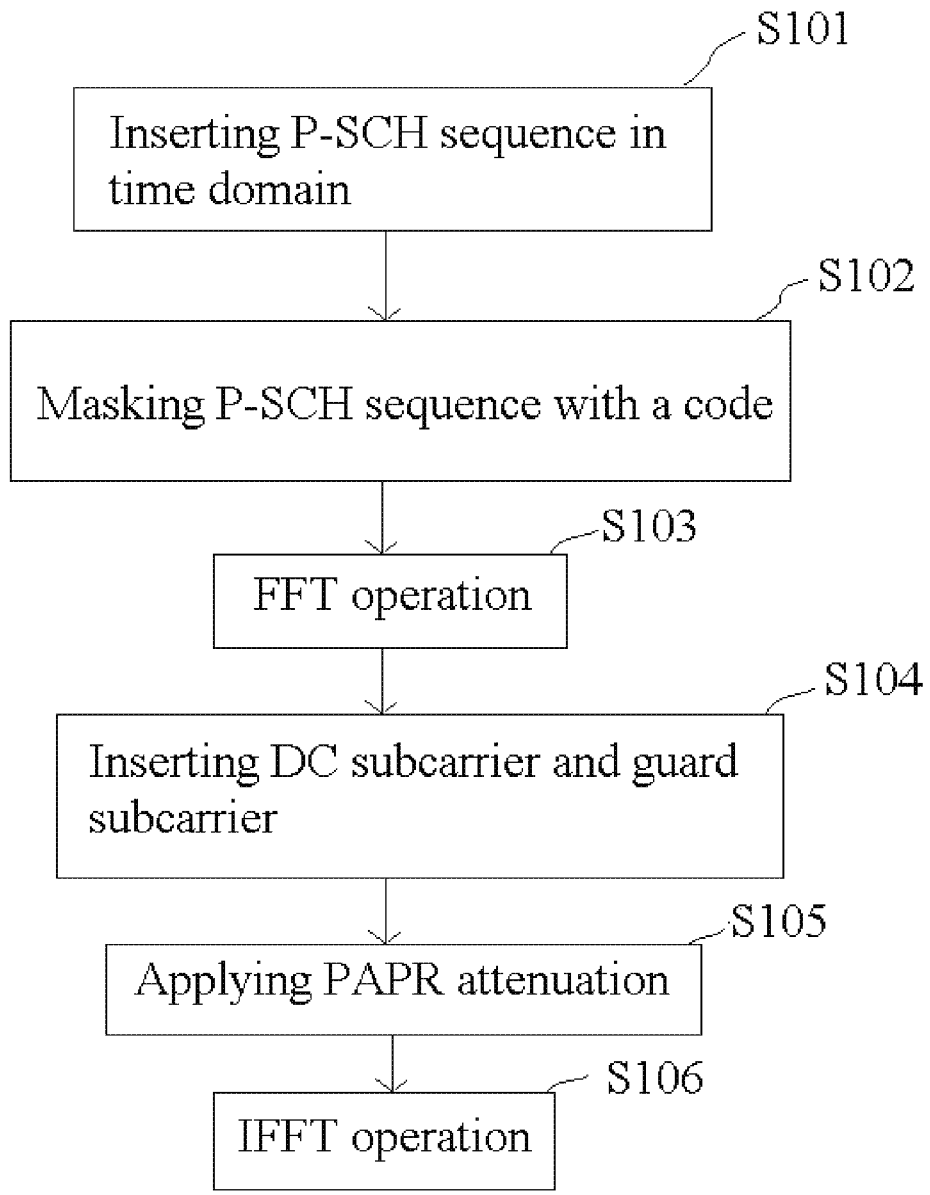
FIG. 10 shows a flow chart for generating P-SCH in time domain and inserting additional information.

FIG. 10 shows a flow chart for generating P-SCH in time domain and inserting additional information.

The steps of generating P-SCH in time domain and inserting additional information can be divided into the following steps.

In a first step S101, a P-SCH sequence is inserted in time domain. In FIG. 9, the P-SCH is generated by repeating a specific sequence (A) twice in time domain.

Preferably, the specific sequence (A) is P-SCH according to the aforesaid hybrid SCH. Yet, the specific sequence (A) can be a random sequence. In particular, the specific sequence (A) can be the P-SCH according to the hierarchical SCH.

In a second step S102, masking is carried out on a specific code. In particular, masking is carried out on the sequence generated in the step S101. There are various results from performing masking on the specific sequence. And, the result of masking represents specific additional information.

The masking means a work for performing data processing according to the specific code. No limitation is put on a type of the specific code and a type of the data processing. Preferably, the code used for the masking is an orthogonal code or a pseudo-orthogonal code. Preferably, the masking operation means a work of multiplying each of the samples of the sequence generated in the step S101 by the code.

Figure 11A:
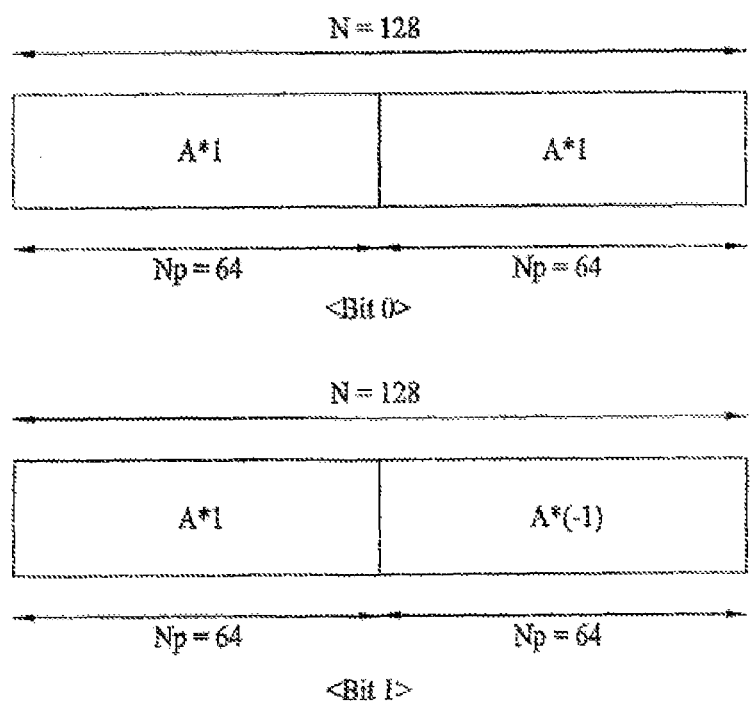
FIGS. 11A to 11C are block diagrams of examples of a sequence on which the masking is performed by the first method of the present embodiment.
Figure 11B:
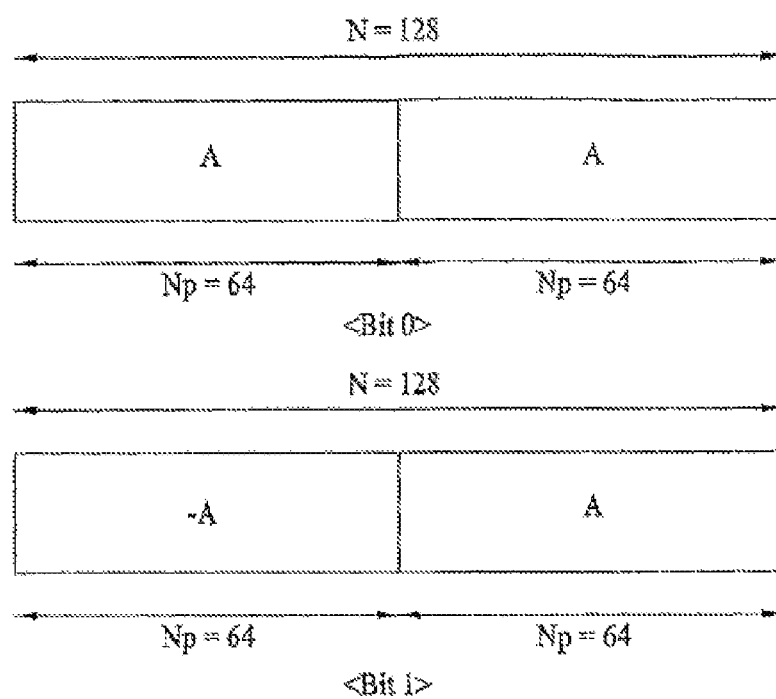
Figure 11C:
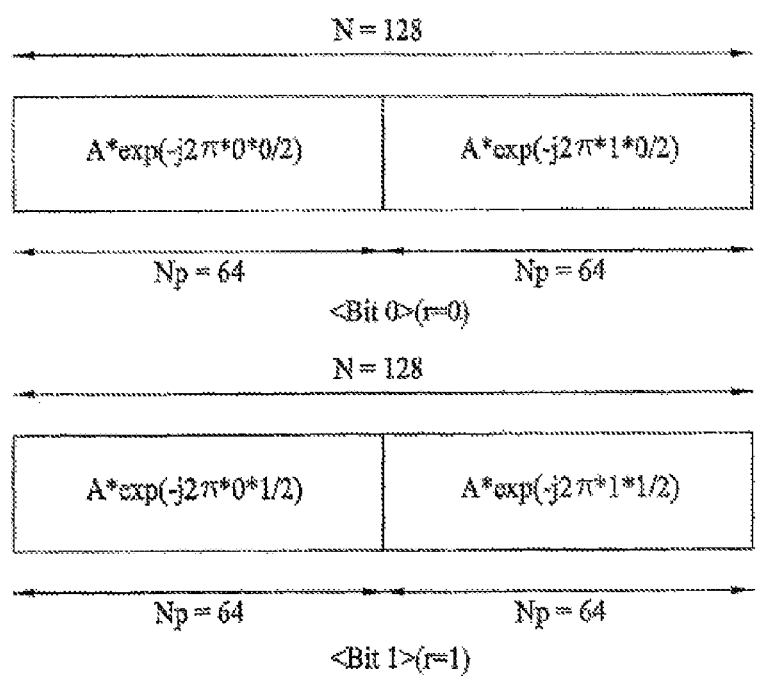

FIGS. 11A to 11C are block diagrams of examples of a sequence on which the masking is performed by the first method of the present embodiment.

FIG. 11A shows a result of performing masking on the sequence shown in FIG. 9 using Walsh codes.

Referring to FIG. 11A, in a case of masking the sequence shown in FIG. 9 using code [1,1], it can be decided that additional information is set to '0'. In a case of masking the sequence shown in FIG. 9 using code [1,−1], it can be decided that additional information is set to '1'.

FIG. 11B shows a result of performing masking on the sequence shown in FIG. 9 using random codes.

Referring to FIG. 11B, the random code includes a sample having a size of '1' and a phase value of '0° ' or '180° '. In a case of masking the sequence shown in FIG. 9 using code [1,1], it can be decided that additional information is set to '0'. In a case of masking the sequence shown in FIG. 9 using code [1,−1], it can be decided that additional information is set to '1'.

FIG. 11C shows a result of performing masking on the sequence shown in FIG. 9 using DFT sequence.

Referring to FIG. 11C, in case of performing masking using DFT sequence $$c(n) = e^{-j2\pi \frac{r}{N}},$$
$$(r = 0, 1, \ldots, N-1),$$

like the contents of FIG. 11C, it can be decided that additional information is set to '0' if r=0. And, it can be decided that additional information is set to '1'.

The cases of FIGS. 11A to 11C are the examples of performing masking using two kinds of codes. Since the examples shown in FIGS. 11A to 11C are just provided for convenience of explanation, it is able to perform the masking using an arbitrary count of codes. Namely, it is able to add additional information constructed with arbitrary bits. For instance, 2-bit additional information can be added by incrementing a count of Walsh codes into 4. And, 3-bit additional information can be added by incrementing a count of Walsh codes into 8. In case of DFT sequence, it is able to generate additional information having a random size by freely adjusting sizes of 'r' and 'N'. In case of arbitrary codes, it is able to adjust a size of additional information by adjusting a type of each code.

The sequence generated in the second step S102 of FIG. 10 is provided to a user equipment for synchronization estimation. The sequence according to the present embodiment is usable for various communication systems. Preferably, the sequence according to the present embodiment is used for a system that transmits a signal via a plurality of orthogonal subcarriers.

If a system, to which the present embodiment is applied, is not the OFDM/OFDMA system, a corresponding sequence is transmitted by passing through a low pass filter (LPF) corresponding to a transmission bandwidth. If DC subcarrier is not taken into consideration by the OFDM/OFDMA specifications, it is able to have the corresponding sequence pass through the LPF without the subcarrier insertion.

Meanwhile, in case that a system, to which the present embodiment is applied, is used for a system (e.g., OFDM, OFDMA, SC-FDMA) that uses a plurality of orthogonal subcarriers, the following steps S103 to S106 are preferably executed in addition. In particular, since the system using a plurality of orthogonal subcarriers needs a DC subcarrier to eliminate a DC component and a guard band subcarrier to eliminate a component of a specific bandwidth, the following steps are preferably executed in addition.

According to one embodiment of the present invention, a step S103 of transforming a time domain sequence into a frequency domain sequence by FFT operation is explained as follows.

First of all, a method of transforming a time domain sequence into a frequency domain sequence in a multi-subcarrier system is represented as Formula 6, in which a length-N sequence generated in time domain is transformed into a frequency domain sequence by N-point FFT.

$$A_k = \sum_{n=0}^{N-1} a_n e^{-j2\pi kn/N} \qquad \text{[Formula 6]}$$

If each sample of the sequence generated by the steps S101 and S102 of FIG. 10 is set to $a_n$, a frequency domain sequence $A_k$ is generated by Formula 6.

A step S104 of inserting DC subcarrier and guard subcarrier according to one embodiment of the present invention is explained as follows.

First of all, in a specific OFDM communication method, insertion of DC subcarrier and insertion of constant guard subcarrier can be required. In case that DC subcarrier and guard subcarrier have to be inserted to meet the specifications defined in the specific OFDM communication method, the step S104 is executed. The insertion of the DC subcarrier means that data 0 is inserted in a subcarrier having a frequency of '0' in frequency domain to solve the problem caused by DC offset in an RF end of transmission/reception.

A step S105 of applying PAPR attenuation to the sequence having undergone the above steps is explained as follows.

First of all, as the DC and guard subcarrier insertions or other data processing are performed, PAPR of signals may increase. In the present embodiment, PAPR attenuation can be re-executed to decrease the increasing PAPR.

A step S106 of transforming the sequence into a time domain sequence by IFFT operation according to one embodiment of the present invention is explained as follows.

First of all, the step S106 is to generate a final signal and is executed according to Formula 7. In this case, a generated sequence can be utilized for execution of synchronization and detection and discrimination of signals.

$$a_n = \frac{1}{N}\sum_{k=0}^{N-1} A_k e^{j2\pi kn/N} \qquad \text{[Formula 7]}$$

2. Second Method

A second method in the following description is characterized in allocating and generating a sequence having specific-sized samples in frequency domain. For instance, in case of generating P-SCH using a sequence A $(A_0, A_1, A_2, \ldots, A_{N-1})$ including N samples, the sequence is generated in a following manner.

First of all, each sample included in a sequence is allocated to a specific frequency index. In this case, the frequency index is to identify a specific subcarrier. If samples are allocated to consecutive frequency indexes, respectively, the samples are allocated to consecutive frequency domains. If samples are allocated to frequency indexes with specific interval, respectively, the samples are allocated with a frequency interval corresponding to the specific interval.

Figure 12:
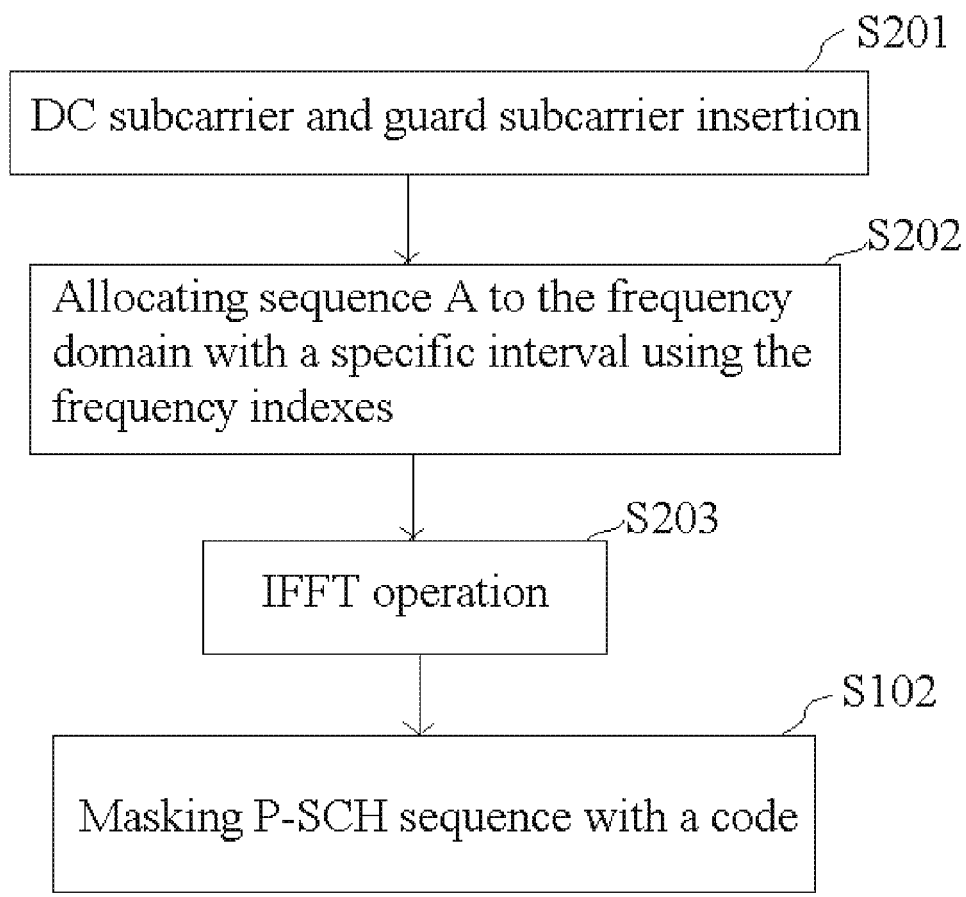
FIG. 12 is a flow chart explaining steps of the second method.

FIG. 12 is a flow chart explaining steps of the second method.

The second method includes the following steps.

First of all, DC subcarrier and guard subcarrier are inserted (S201). In particular, a component of a specific region in frequency domain is changed into '0'.

Subsequently, a specific sequence A is allocated to the frequency domain with a specific interval using the frequency indexes (S202).

A size of the specific interval can be freely set. For instance, it is able to allocate the sequence A with two frequency index intervals. In this case, it is able to allocate each sample of the sequence A to either an even-order frequency index or an odd-order frequency index.

FIG. 13 is a diagram to explain a method of allocating a specific sequence in frequency domain.

In (a) of FIG. 13, if a specific sequence is allocated to consecutive frequency indexes, a sequence (e.g., sequence including $P_0$ to $P_{127}$) in time domain is shown. In particular, a signal shown in (a) of FIG. 13 corresponds to a result from allocating specific samples $P_0$ to $P_{127}$ to 128 consecutive frequency indexes in frequency domain, respectively.

In case of allocating samples $P_0$ to $P_{127}$ to even-order frequency indexes, it is able to configure a signal shown in (b) of FIG. 13 due to the characteristics of over-sampling. In (b) of FIG. 13, a waveform B is repeated. The repetitive waveform shown in (b) of FIG. 13 has a shape obtained from compressing a waveform shown in (a) of FIG. 13. Since the signal shown in (b) of FIG. 13 includes identical waveforms repeated in time domain, it can be represented as a [B|B] type signal.

Meanwhile, in case of allocating samples $P_0$ to $P_{127}$ to odd-order frequency indexes, it is able to configure a signal shown in (c) of FIG. 13 due to the characteristics of DFT operation. The signal shown in (c) of FIG. 13 has a form different from that shown in (b) of FIG. 13. In particular, the signal shown in (c) of FIG. 13 has a different form in a time domain due to shift of frequency indexes. Because of the characteristics of DFT operation, the signal allocated to the odd-order frequency indexes has a [C|−C] shape in time domain.

In brief, it is able to allocate the sequence A to frequency indexes with a specific interval. And, a count of waveform repetitions in time domain and a waveform in time domain depend on a size of the interval and the frequency indexes to which the sequence A is allocated.

In case that a base station generates P-SCH according to the second method, the base station pre-decides a size of the interval and the frequency indexes for the allocation. As mentioned in the foregoing description, since a waveform of signal transmitted by the base station depends on the size of the interval and the frequency indexes for the allocation, a method of generating a sequence in frequency domain need to be decided in advance. Besides, since the P-SCH need to be a cell common sequence, a predetermined sequence generating method is preferably known to a user equipment in advance.

For instance, the base station decides to allocate the samples of the sequence A to the even-order frequency indexes. In this case, a signal having the [B|B] shape shown in (b) of FIG. 13 is generated. Since the user equipment already knows that the [B|B] type signal will be generated, it is able to perform cross-correlation based detection. Moreover, since the signal itself is repeated, auto-correlation based detection is possible as well.

The step S202 of FIG. 12 can be executed prior to the step S201 of FIG. 12. So, there is no limitation put on an order between the step of inserting the DC/guard subcarrier and the step of generating the P-SCH sequence in frequency domain.

Yet, the step of generating the P-SCH sequence is preferably executed prior to a step S203 that is explained in the following description.

In order to add additional information to the P-SCH, a transform into a signal in time domain needs to be performed. So, IFFT operation is performed on the generated P-SCH (S203).

And, masking is carried out on a result of the step S203. In this case, the masking on the result of the step S203 is carried out by the step S102.

After completion of the masking on the result of the step S203, the steps S103 to S106 (shown in FIG. 10; not shown in FIG. 12) are preferably carried out. In particular, the DC and guard subcarriers are preferably inserted and the PAPR attenuation scheme is preferably applied. Although the DC and guard subcarriers have been already inserted by the step S201, components except '0' may be inserted in DC and guard subcarrier components. So, it is more preferable that '0' is inserted or padded into the DC and guard subcarriers by executing the steps S103 to S106.

In case of the guard subcarrier, it is able to obtain the same effect of inserting a guard subcarrier using a specific filter (e.g., LPF).

If additional information is added by the first or second method, it is able to acquire synchronization using the conventional method in a same manner. In particular, a receiving end (e.g., user equipment) acquires timing synchronization via a conventional hierarchical or hybrid SCH. Moreover, since frequency synchronization corresponds to a function having an arc tangent period of pi, it can be executed in the same manner of the hybrid method according to the example of two repetitions. Namely, despite the addition of the additional information, the method of acquiring the time and frequency synchronizations does not change.

The inserted additional information enables code information to be detected by differential correlation represented as Formula 8 after completion of the time and frequency synchronizations using the feature of the same absolute value.

$$\hat{b} = \text{abs}\left[Re\left\{\sum_{n=0}^{N_{\textit{fft}}/2}[r(\hat{d}+n)]^*[r(\hat{d}+n+N_{\textit{fft}}/2)]\right\}\right] \quad \text{[Formula 8]}$$

if $\hat{b} \geq 0$, decision to bit 0 else, decision to bit 1

According to Formula 8, it is able to reconstruct the additional information using the features of a signal received by the receiving end.

The additional information can be reconstructed in various ways including the example shown in Formula 8.

For instance, it is able to reconstruct the additional information by hypothesis detection using cross-correlation. For example, a transmitting end (e.g., base station) inserts additional information by making using Walsh codes, [1,1] code corresponds to additional information '0', and [1,−1] code corresponds to additional information '1'. In this case, a signal transmitted by the transmitting end has a shape of [A|A] or [A|−A] in time domain. And, since a waveform A is attributed to a cell common sequence, a user equipment has already known the waveform A. So, the user equipment is able to measure a cross-correlation value for the received signal via the [A|A] or [A|−A] signal. In particular, the user equipment is able to detect the additional information by confirming a peak value though the hypothesis detection using cross-correlation.

3. Third Method

The third method includes the step of generating P-SCH sequence in frequency domain and adding additional information in frequency domain.

Figure 14:
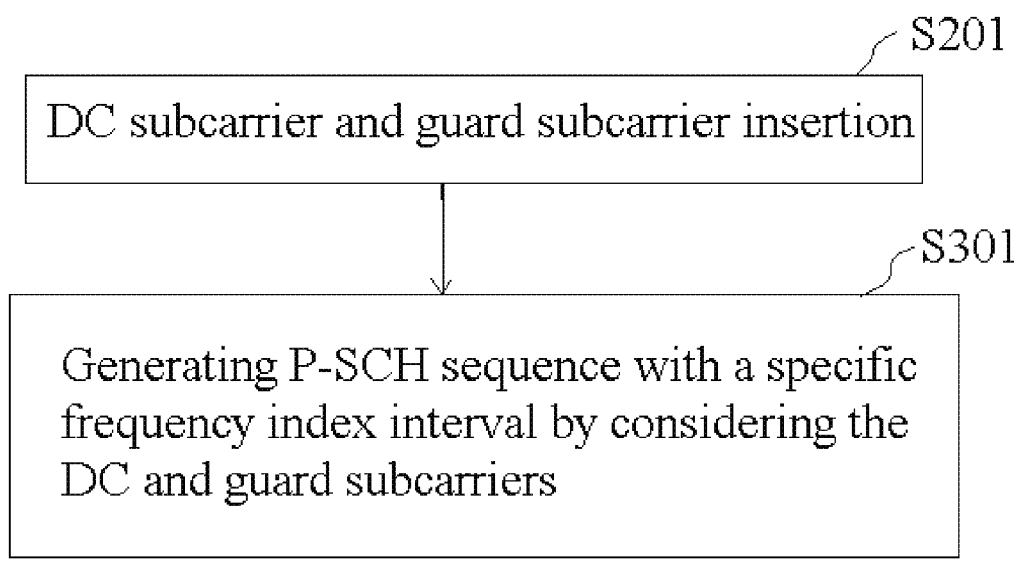
FIG. 14 is a flow chart explaining third method.

FIG. 14 is a flow chart explaining third method.

In particular, DC and guard subcarriers are generated by the same step of the step S201 (FIG. 12). And, a P-SCH sequence is generated with a specific frequency index interval by considering the generated DC and guard subcarriers (S301). For instance, in case of generating P-SCH using a sequence-A ($A_0, A_1, A_2, \ldots, A_{N-1}$) including N samples, a sequence is generated in a following manner.

First of all, if additional information is set to '0', the N samples are allocated to even-order frequency indexes, respectively. In this case, as mentioned in the description of FIG. 13, the [B|B] waveform is generated in time domain. Meanwhile, if additional information is set to '1', the N samples are allocated to odd-order frequency indexes, respectively. In this case, as mentioned in the description of FIG. 13, the [C|–C] waveform is generated in time domain.

A size of the additional information is not limited. In case of adding 2-bit additional information, four different waveforms are needed. So, it is able to allocate the N samples with an interval of four frequency indexes. Through this, it is able to obtain four kinds of waveforms repeated four times in time domain. Through this, it is able to add additional information.

The P-SCH generated in frequency domain in the above manner is then transformed into a time domain signal by IFFT operation according to the step S106 as shown in FIG. 10.

In brief, the third method generates a plurality of cell common sequences. And, each of a plurality of the cell common sequences represents specific additional information. Unlike the first or second method, the third method uses a plurality of the cell common sequences. In this case, synchronization acquisition in a user equipment can be carried out in a following manner.

First of all, the user equipment has already known a plurality of cell common sequences. N particular, the user equipment has already known the [B|B] signal for the case of allocating the N samples to the even-order frequency indexes and the [C|–C] signal for the case of allocating the N samples to the odd-order frequency indexes. And, the user equipment is able to acquire synchronization by finding cross-correlation between the [B|B] or [C|–C] signal and the received signal. Namely, even if synchronization is performed using cross-correlation, synchronization is acquired by performing hypothesis detection and additional information is obtained.

Meanwhile, it is able to acquire synchronization using auto-correlation instead of cross-correlation. Since a plurality of the cell common sequences are allocated to the frequency indexes with a constant interval, respectively, they have repetitive characteristics. So, the user equipment is able to acquire synchronization using the characteristic of the signal that is repeated in time domain.

The first to third methods propose the scheme of performing the masking on the sequence generated in frequency or time domain using specific codes. And, a fourth method explained in the following description proposes a method of adding additional information using fine constellation modulation.

4. Fourth Method

A fourth method is characterized in performing micro-constellation modulation in addition.

First of all, at least one information bit to be transmitted to a receiving end is constellation-mapped to one symbol. As constellation mapping according to the related art, there are QPSK, BPSK, 16QAM and the like. At least one symbol (e.g., at least one QPSK symbol) is included in one OFDM symbol to be transmitted to the receiving end.

In this case, such a constellation mapping scheme as QPSK can be called macro-constellation modulation (i.e., conventional scheme). And, a modulation scheme applied for addition of additional information can be called micro-constellation modulation or fine constellation modulation.

Symbols (e.g., QPSK symbols) having undergone macro-constellation modulation are mapped to preset position on a constellation map. If a transmitting end transmits the symbols by rotating the symbols at a predetermined angle from the preset positions in addition, it can be seen that additional information is added through the additionally rotated angle.

A basic concept of the fourth method of the present invention is to use 2-step constellation mapping. In particular, macro-constellation modulation is carried out on a sequence corresponding to a channel for synchronization estimation. And, micro-constellation modulation is additionally applied to the sequence having undergone the macro-constellation modulation. In this case, a method of the micro-constellation modulation is decided according to additional information to be added.

The following method relates to a method adding normal M-bits.

The fourth method is applicable to a hierarchical SCH, a non-hierarchical SCH, or a hybrid SCH. For convenience of explanation, a method of adding additional information to a hierarchical SCH is explained in the following description. And, a case of multiplexing between P-SCH and S-SCH by TDM is explained. Yet, since the fourth method is applicable to various synchronization channel structures, it is not restricted by the following embodiment of the present invention.

Figure 15:
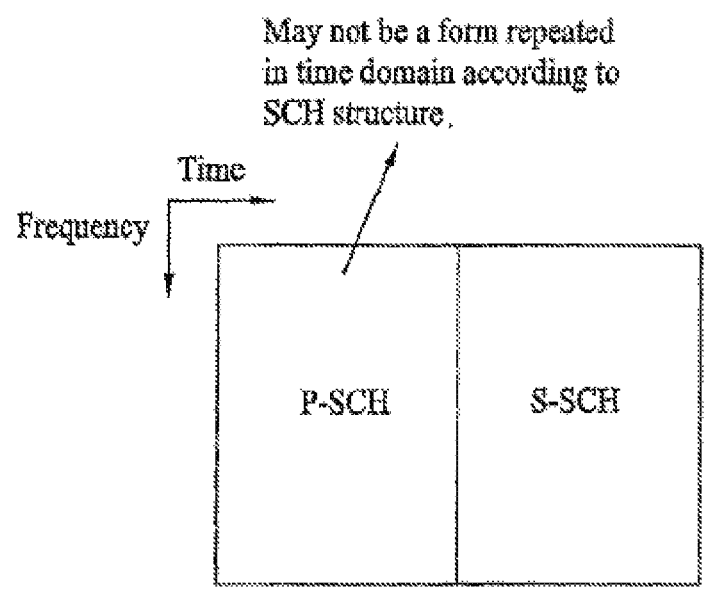
FIG. 15 is a block diagram of P-SCH and S-SCH in which additional information will be included.

FIG. 15 is a block diagram of P-SCH and S-SCH in which additional information will be included.

Referring to FIG. 15, P-SCH and S-SCH can be generated according to the aforesaid method. In particular, the P-SCH and S-SCH can be generated in frequency or time domain. And, the P-SCH and S-SCH can be generated by repetition in time domain or by allocating a sequence with a specific frequency index interval in frequency domain.

According to the fourth method, an M-bit additional information adding method is carried out by multiplying a P-SCH part of the drawing by a phase function corresponding to the corresponding bits.

If a time domain sequence of P-SCH or S-SCH is p(n) (n=0, 1, 2, ..., $N_{fft}-1$), $p_{bit(n)}$ after bit addition is represented as Formula 9A.

$$P_{bit(n)} = e^{j\frac{2\pi m}{2^M}} p(n) \quad \text{[Formula 9A]}$$

$$n = 0, 1, \ldots, N-1$$

$$m = 0, 1, \ldots, 2^M - 1$$

In Formula 9A, 'm' indicates an $m^{th}$ additional information. For instance, in case of 1 bit of M=1, m=0 or 1 is possible. In case of 2 bits of M=2, m=0, 1, 2, or 3 is possible.

In Formula 9A, 'N' indicates a length of sequence. '$P_{bit(n)}$' indicates a time domain sequence to which additional information is added. 'P(n)' indicates a time domain sequence before additional information is added thereto. And, 'n' indicates a time domain sample index.

Formula 9A can be equivalently represented as Formula 9B. And, Formula 9A is an example represented as a frequency domain sequence.

$$P_{bit(k)} = e^{j\frac{2\pi m}{2^M}} P(k)$$ [Formula 9B]

$$k = 0, 1, \ldots, N-1$$

$$m = 0, 1, \ldots, 2^M - 1$$

In Formula 9B, '$P_{bit(k)}$' indicates a frequency domain sequence to which additional information is added in frequency domain. 'P(k)' indicates a frequency domain sequence before additional information is added thereto. And, 'k' indicates a frequency domain sample index.

Figure 16A:
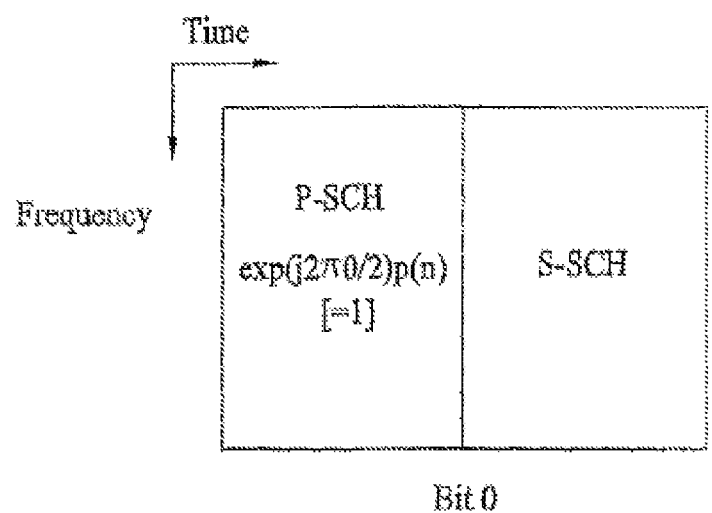
FIG. 16A and FIG. 16B are block diagrams to explain examples of adding 1-bit additional information.
Figure 16B:
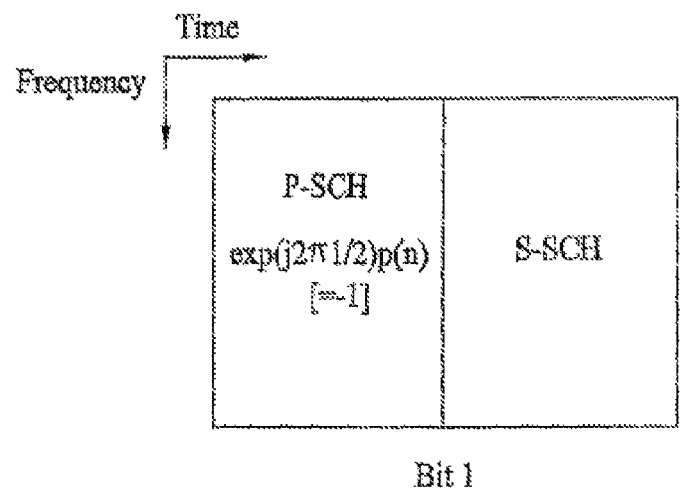
Figure 17A:
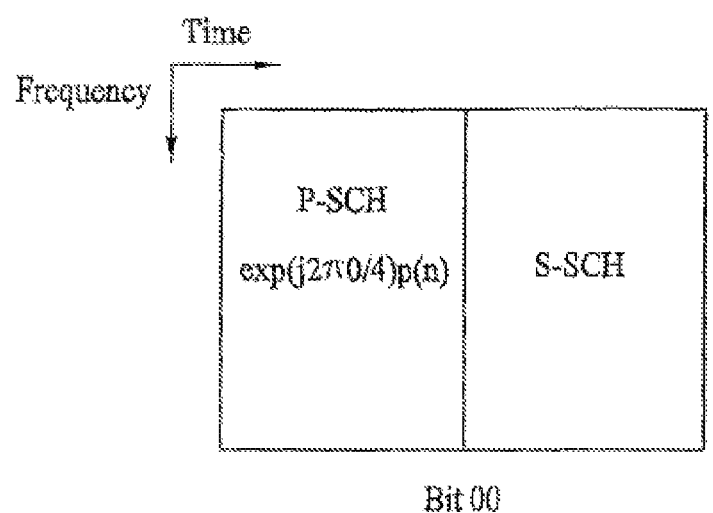
FIGS. 17A to 17D are block diagrams to explain examples of adding 2-bit additional information, in which additional information is added to S-SCH.
Figure 17B:
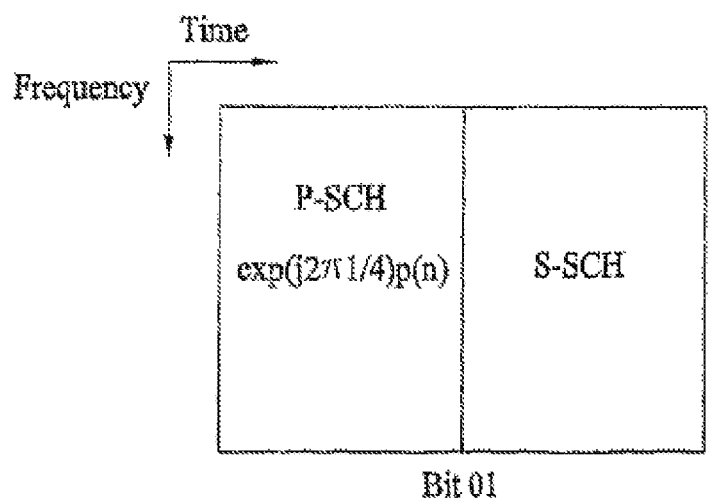
Figure 17C:
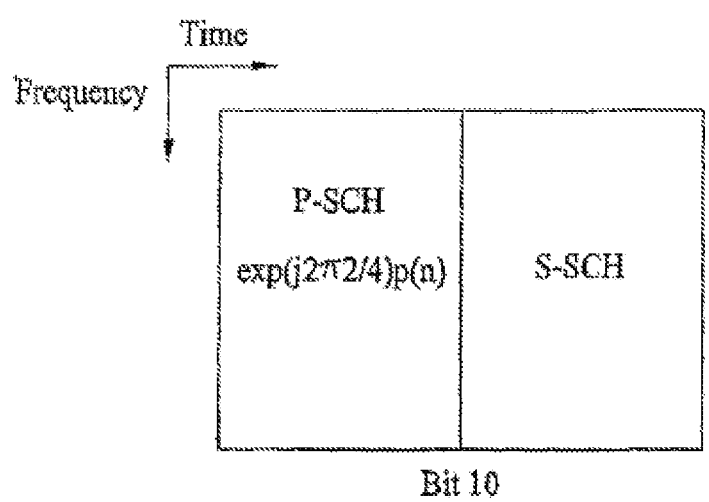
Figure 17D:
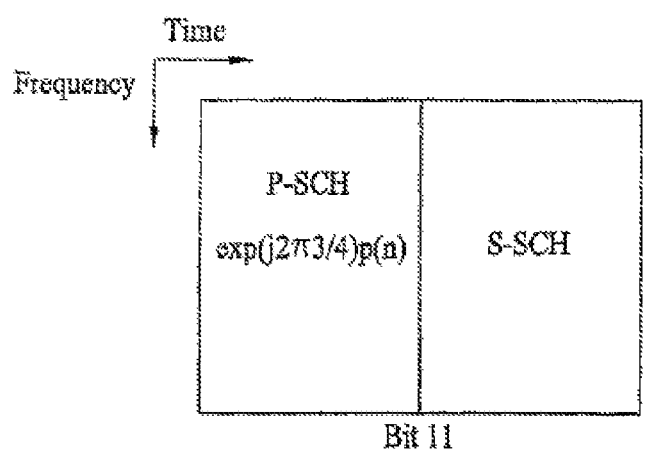

FIG. 16A and FIG. 16B are block diagrams to explain examples of adding 1-bit additional information.

Referring to FIG. 16A and FIG. 16B, it is able to add 1-bit additional information by not varying phases of sequences included in P-SCH or by rotating the phases by 180° each.

The example shown in FIG. 16A indicates that additional information corresponding to 'bit 0' is included. And, the example shown in FIG. 16B indicates that additional information corresponding to 'bit 1' is included.

Of course, it is able to add the additional information to each of P-SCH and S-SCH. It is able to add the additional to either P-SCH or S-SCH. And, it is also able to add the additional to both P-SCH and S-SCH simultaneously. In case of M=1, the additional information to be added includes '+1' and '−1'.

FIGS. 17A to 17D are block diagrams to explain examples of adding 2-bit additional information, in which additional information is added to S-SCH for example.

Referring to FIGS. 17A to 17D, if M=2, additional information corresponds to '00', '01', '10' or '11'. Of course, the additional information can be applied to both P-SCH and S-SCH, either P-SCH or S-SCH, or P-SCH and S-SCH, respectively.

A method of searching additional information bits according to the present invention can be executed in various ways. For convenience of explanation, a method of detecting bits by inserting additional information bit(s) into P-SCH and by performing channel estimation on S-SCH is explained.

If P-SCH and S-SCH, as shown in FIGS. 17A to 17D, are adjacent to each other, it is able to assume that both of the SCHs undergo the same channel. In this case, it is able to use a radio channel estimated as S-SCH in detecting additional information added to P-SCH.

For convenience, it is assumed that all subcarriers are used for a frequency part of P-SCH. And, it is also assumed that bit information detection is carried out after completion of time/frequency synchronization with P-SCH and cell ID detection in S-SCH. In this case, a time domain signal received on P-SCH is represented as Formula 9C.

$$r_{psch}(n) = p_{bit(n)} * h(n) + n(n)$$ [Formula 9C]

In Formula 9C, 'h(n)' indicates an impulse response of channel, 'n(n)' indicates AWGN, and '*' indicates a convolutional operation. A result of Formula 9C can be represented as Formula 9D.

$$r_{psch}(k) = P_{bit(k)} * H(k) + N(k)$$ [Formula 9D]

In Formula 9D, a signal indicates a frequency domain signal. In this case, 'H(k)' indicates a frequency response of channel and 'N(k)' indicates AWGN. Time and frequency domain signals received on S-SCH are represented as Formula 9E and Formula 9F, respectively.

$$r_{ssch}(n) = s(n) * h(n) + n(n)$$ [Formula 9E]

$$R_{ssch}(k) = S(k) * H(k) + N(k)$$ [Formula 9F]

In Formula 9E and Formula 9F, 'S(k)' indicates an S-SCH signal transmitted in frequency domain and 's(n)' indicates an S-SCH signal transmitted in time domain.

According to the above assumptions, channel estimation is executed in S-SCH. For instance, LS (least square) channel estimation can be executed according to Formula 9G.

$$\hat{H}(k) = \frac{R_{ssch}(k)}{S(k)}$$ [Formula 9G]

In Formula 9G, as mentioned in the foregoing description, since the detection for cell ID has been completed, 'S(k)' is a value already known by the receiving end.

P-SCH is recovered as Formula 9H using the estimated radio channel.

$$R_{eq}(k) = R_{psch}(k)/H(\hat{k}) = P_{bit(k)} + N(k)/H(\hat{k})$$ [Formula 9H]

It is able to detect added bit information by Formula 9I using '$R_{eq}(k)$' of which channel is compensated for.

$$\hat{m} = \frac{M}{2\pi} \arg\left\{ \frac{1}{N} \sum_{k=0}^{N-1} R_{eq}(k) P(k) \right\}$$ [Formula 9I]

In Formula 9I, 'arg{ }' indicates a phase component. And, '{ }' indicates a complex result value of correlation.

The aforesaid additional information adding method is applicable to the hybrid SCH or the non-hierarchical SCH. Namely, by an operation of rotation by a phase corresponding to the additional information, it is able to add the additional information.

Hereinafter, a new method in which the first to third methods and the fourth method are combined together is proposed as follows.

A fifth method in the following description relates to a method of adding additional information using both code masking and micro-constellation modulation.

5. Fifth Method

First of all, it is preferable that a fifth method is applied to a sequence having a repetitive structure in time domain. For instance, the fifth method is applied to hybrid SCH as follows.

Three methods of adding additional information by masking are proposed. The fifth method can use one of the three methods of adding addition information. Hereinafter, a method which uses the third method is explained.

According to the aforesaid third method, in case of allocating a sequence to an odd-order frequency index, additional information '1' (or '0') is indicated. In case of allocating a sequence to an even-order frequency index, additional information '0' (or '1') is indicated.

According to the aforesaid explanation, if a sequence is allocated to an odd-order frequency index, a [C|−C] type waveform, as mentioned in (c) of FIG. 11, is formed in time domain. If a sequence is allocated to an even-order frequency index, a [B|B] type waveform, as mentioned in (b) of FIG. 11, is formed in time domain.

In addition, micro-constellation modulation can be performed on the corresponding result. In particular, by rotating a phase by 0° or 180°, it is able to add additional information.

Figure 18:
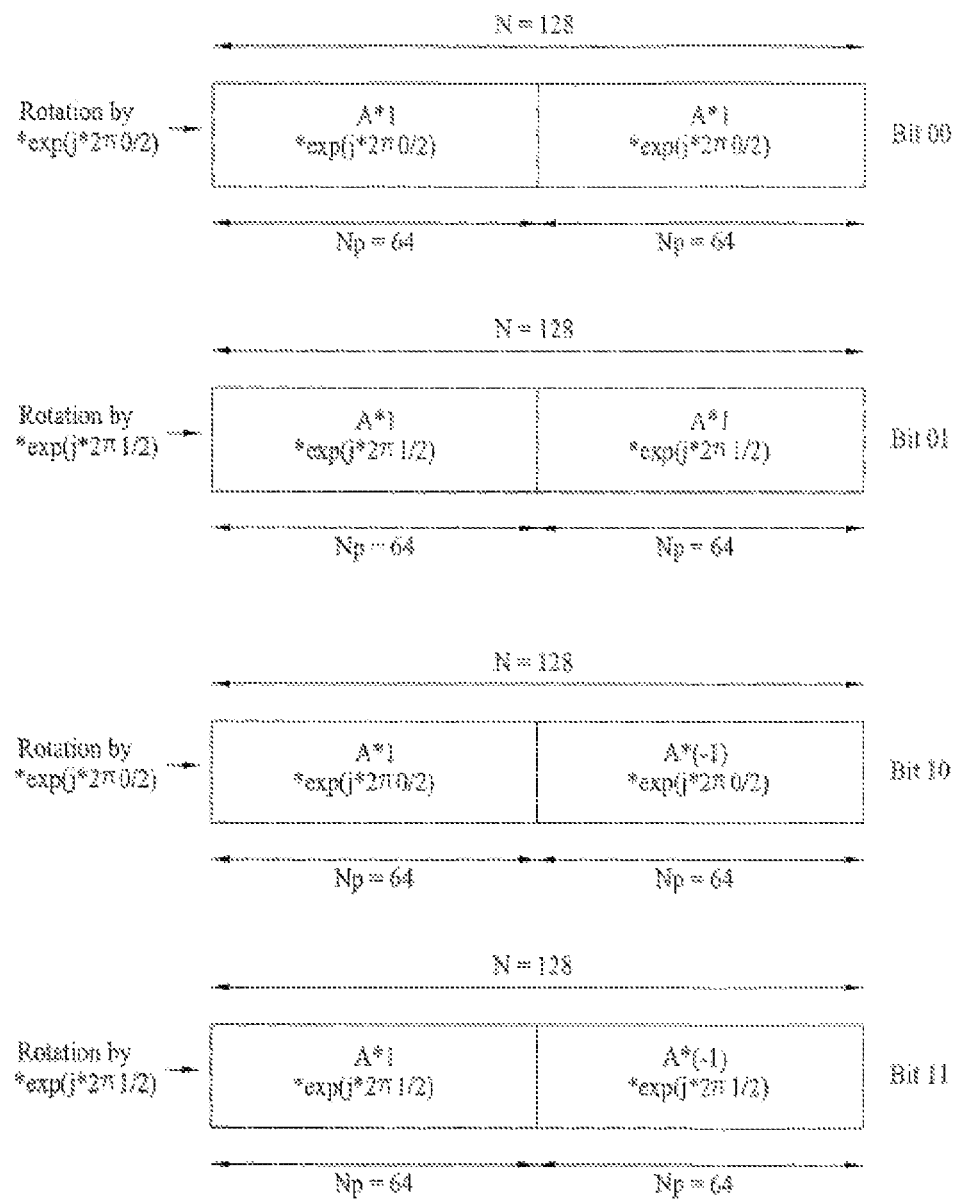
FIG. 18 is a diagram of examples by both a third method of the present embodiment and micro-constellation modulation.

FIG. 18 is a diagram of examples by both a third method of the present embodiment and micro-constellation modulation.

Referring to FIG. 18, in case that added additional information is '00', a sequence type is [B|B]. So, MSB of additional information is decided as '0'. Meanwhile, since a phase is changed by 0° according to micro-constellation modulation, LSB of additional information is decided as '0'.

In case that added additional information is '01', a sequence type is [B|B]. So, MSB of additional information is decided as '0'. Meanwhile, since a phase is changed by 180° according to micro-constellation modulation, LSB of additional information is decided as '1'.

In case that added additional information is '10', a sequence type is [C|–C]. So, MSB of additional information is decided as '1'. Meanwhile, since a phase is changed by 0° according to micro-constellation modulation, LSB of additional information is decided as '0'.

In case that added additional information is '11', a sequence type is [C|–C]. So, MSB of additional information is decided as '1'. Meanwhile, since a phase is changed by 180° according to micro-constellation modulation, LSB of additional information is decided as '1'.

In order to detect additional information by the fifth method, it is decided whether a sequence has a [B|B] type or a [C|–C] type and a phase value rotated by micro-constellation modulation is then calculated.

The fourth and fifth methods of the present embodiment are characterized in using micro-constellation modulation.

In the above examples, a case that a count of added additional informations corresponds to a power of 2, which does not put limitation on the present embodiment.

Namely, it is able to convert Formula 9A to Formula 10A.

$$P_{bit(n)} = e^{j\frac{2\pi m}{X}} p(n) \quad \text{[Formula 10A]}$$
$$n = 0, 1, \ldots, N-1$$
$$m = 0, 1, \ldots, X-1$$

And, it is able to convert Formula 9B to Formula 10B.

$$P_{bit(k)} = e^{j\frac{2\pi m}{X}} P(k) \quad \text{[Formula 10B]}$$
$$k = 0, 1, \ldots, N-1$$
$$m = 0, 1, \ldots, X-1$$

In this case, Formulas 9C to 9H are applied as they are. And, Formula 9I is converted to Formula 10C to be applied.

$$\hat{m} = \frac{X}{2\pi} \arg\left\{ \frac{1}{N} \sum_{k=0}^{N-1} R_{eq}(k) P(k) \right\} \quad \text{[Formula 10C]}$$

The above-explained example shown in FIG. 18 is applicable to hierarchical or non-hierarchical SCH.

In case that additional information is added through non-hierarchical SCH, it is able to reconstruct the additional information by the following operation.

First of all, an operation of adding additional information by a transmitting end is identically applied to the non-hierarchical SCH or other SCHs.

A receiving end is able to detect initial synchronization based on auto-correlation. And, the receiving end is able to acquire frequency synchronization.

Subsequently, the receiving end detects a sequence index used for SCH. The receiving end performs integer-times frequency offset estimation using the detected sequence index. The receiving end then corrects the estimated offset.

The receiving end estimates a channel using the detected sequence and then compensates for the channel.

After completion of the channel estimation, additional information by micro-constellation modulation is obtained.

In the fourth or fifth method of the present embodiment, micro-constellation modulation is able to use a plus phase value or a minus phase value. Namely, it is able to convert Formula 10A and Formula 10B to Formula 11A and Formula 11B, respectively.

$$P_{bit(n)} = e^{-j\frac{2\pi m}{X}} p(n) \quad \text{[Formula 11A]}$$
$$n = 0, 1, \ldots, N-1$$
$$m = 0, 1, \ldots, X-1$$

$$P_{bit(k)} = e^{-j\frac{2\pi m}{X}} P(k) \quad \text{[Formula 11B]}$$
$$k = 0, 1, \ldots, N-1$$
$$m = 0, 1, \ldots, X-1$$

And, it is able to convert Formula 10C to Formula 11C.

$$\hat{m} = -\frac{X}{2\pi} \arg\left\{ \frac{1}{N} \sum_{k=0}^{N-1} R_{eq}(k) P(k) \right\} \quad \text{[Formula 11C]}$$

In a constellation map, a phase of each symbol (e.g., QPSK symbol, etc.) can be rotated clockwise or counterclockwise by micro-constellation modulation.

The additional information inserting method has the following advantages. First of all, it is able to insert additional bit information without changing a previous structure. Secondly, additional complexity is prevented from taking place.

The additional information added by the present method is explained as follows.

First of all, no limitation is put on a type of the additional information. And, various kinds of information for communications can be included. For instance, it is able to use the additional information as information for a length of cyclic prefix (hereinafter abbreviated CP). For instance, cyclic prefixes can be classified into short CP and long CP according to their lengths. In this case, it is able to represent a type of CP via the additional information.

And, the information may include information for an antenna mode. In particular, the information is able to indicate whether an antenna is a single antenna or a multi-antenna.

Besides, various kinds of information are possible. For instance, various kinds of information such as subframe synchronization information (indicating whether a first subframe of Nth radio frame or a second subframe of Nth radio frame), BCH bandwidth (1.25 MHz or 5 MHz) and the like can be included. And, cell group ID information can be additionally inserted.

Figure 19:
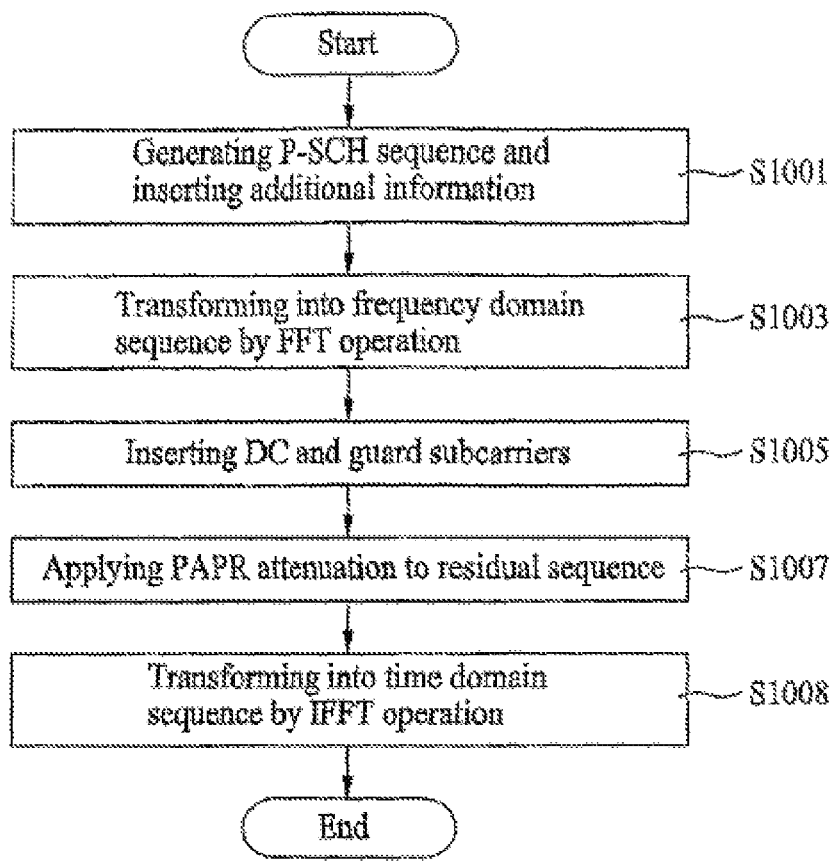
FIG. 19 is a flowchart of a method of generating a sequence for a synchronization channel according to an embodiment of the present invention.

FIG. 19 is a flowchart of a method of generating a sequence for a synchronization channel according to an embodiment of the present invention. FIG. 19 shows an example of P-SCH among sequences for synchronization channels.

Referring to FIG. 19, according to the above-explained five kinds of methods, a sequence for a synchronization channel (e.g., P-SCH sequence, S-SCH sequence, hybrid sequence, non-hierarchical SCH sequence) is generated. And, additional information is then inserted in the generated sequence (S1001). The additional information inserting step is carried out by one of the above-explained five kinds of methods. In particular, masking for codes is used, the additional information inserting scheme using micro-constellation modulation is used, or both of the masking and the micro-constellation modulation are used.

The P-SCH generated by the above step is transformed into a time domain sequence by steps S1003 to S1009 corresponding to the aforesaid steps S103 to S106 of FIG. 10 and is then transmitted to a user equipment.

A communication apparatus according to the present embodiment is able to include independent modules for the respective steps.

Figure 20:
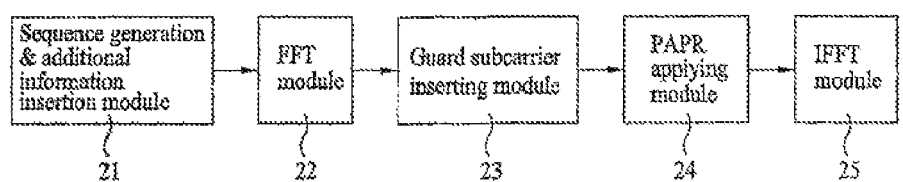
FIG. 20 is a block diagram of a transmitting apparatus according to an embodiment of the present invention.

FIG. 20 is a block diagram of a transmitting apparatus according to an embodiment of the present invention.

Referring to FIG. 20, a transmitting apparatus according to an embodiment of the present invention may include a sequence generation & additional information insertion module 21 according to one of the five kinds of methods, an FFT module 22, a DC & guard subcarrier inserting module 23, a PAPR scheme applying module 24 and an IFFT module 25.

Figure 21:
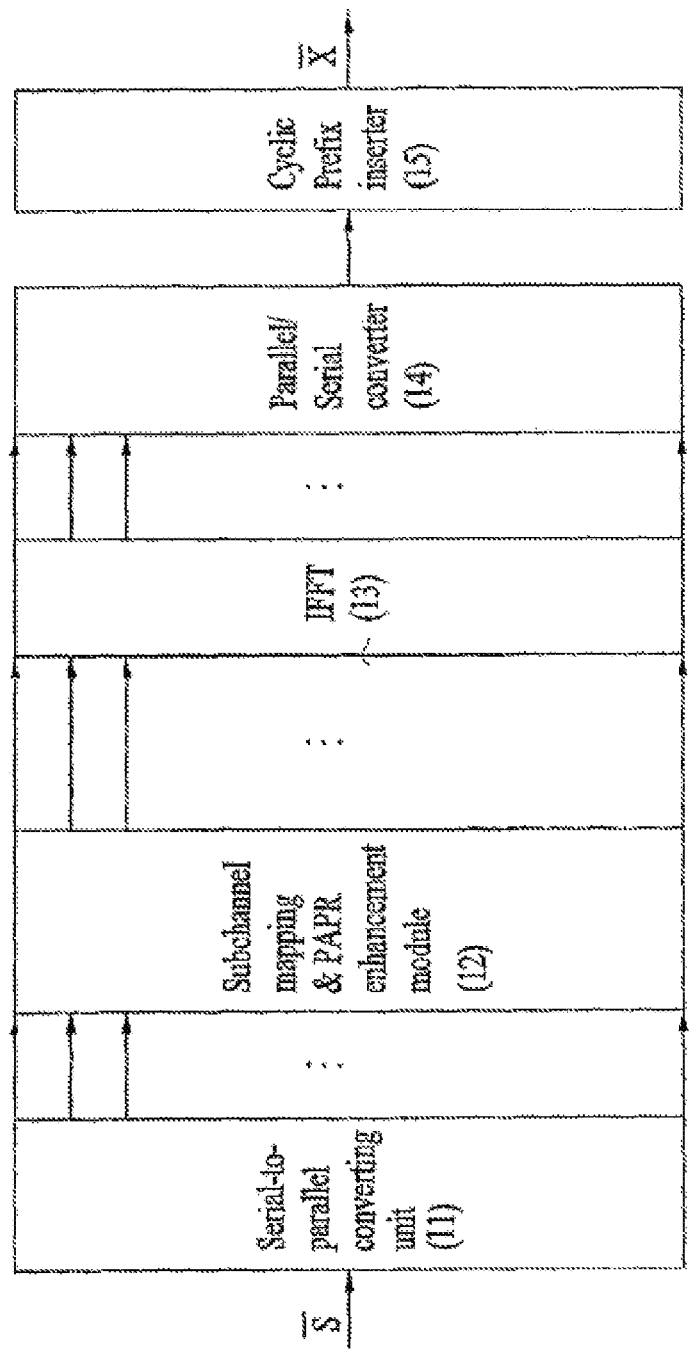
FIG. 21 is a block diagram of a communication apparatus for transmitting P-SCH according to the present invention.

And, the communication apparatus according to the present invention can be implemented according to FIG. 21.

FIG. 21 is a block diagram of a communication apparatus for transmitting P-SCH according to the present invention.

Referring to FIG. 21, a communication apparatus for transmitting P-SCH according to the present invention includes a serial-to-parallel converting unit 11, a subchannel mapping & PAPR enhancement module 12 performing symbol-to-subcarrier mapping and PAPR enhancement, an IFFT module 13 performing IFFT, a parallel-to-serial converting module 14, and a CP inserting module 15 inserting a cyclic prefix.

An output signal by the steps S1001 to S1009 is inputted to the apparatus shown in FIG. 21 and is then transmitted to a receiving end. Yet, since the step S107 is performed by the apparatus shown in FIG. 15, if the output signal is transmitted by the apparatus shown in FIG. 21, it is able to omit the step S1007. Moreover, since an operation of inserting the guard subcarrier in the step S1005 can be implemented by a filter (not shown in the drawing) separately provided to the apparatus shown in FIG. 21, it is able to omit the guard subcarrier inserting operation.

Second Embodiment

First of all, a method of generating a sequence usable for a synchronization channel is explained as follows. Meanwhile, it is able to use both of the first embodiment and the second embodiment of the present invention simultaneously. In particular, after a sequence is generated according to the second embodiment of the present invention, it is able to add additional information to the generated sequence according to the first embodiment of the present invention.

A code sequence configuring a synchronization channel or a preamble includes orthogonal or quasi-orthogonal codes having good characteristics of cross-correlation. And, the preamble signal indicates a reference signal used for such a purpose as initial synchronization, cell search, channel estimation and the like used by a communication system.

For instance, in case of PI (Portable Internet, Specifications for 2.3 GHz band Portable Internet Service—Physical Layer) PN codes are masked on 127 kinds of sequences except a case of all zeros using 128×128 Hardamard matrix and the corresponding sequences are inserted in frequency domain.

Figure 22A:
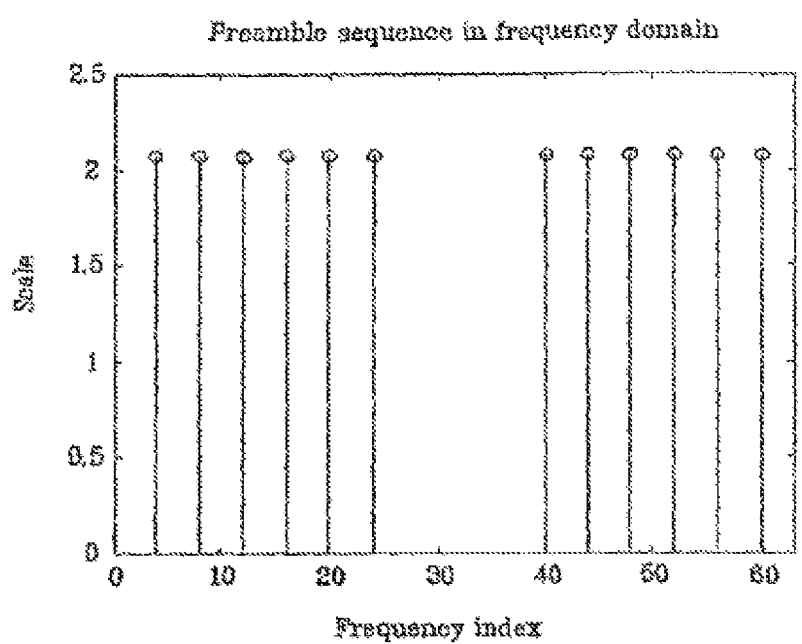
FIG. 22A and FIG. 22B are diagrams of frequency and time domain signals of a short preamble used by IEEE 802.11a, respectively.
Figure 22B:
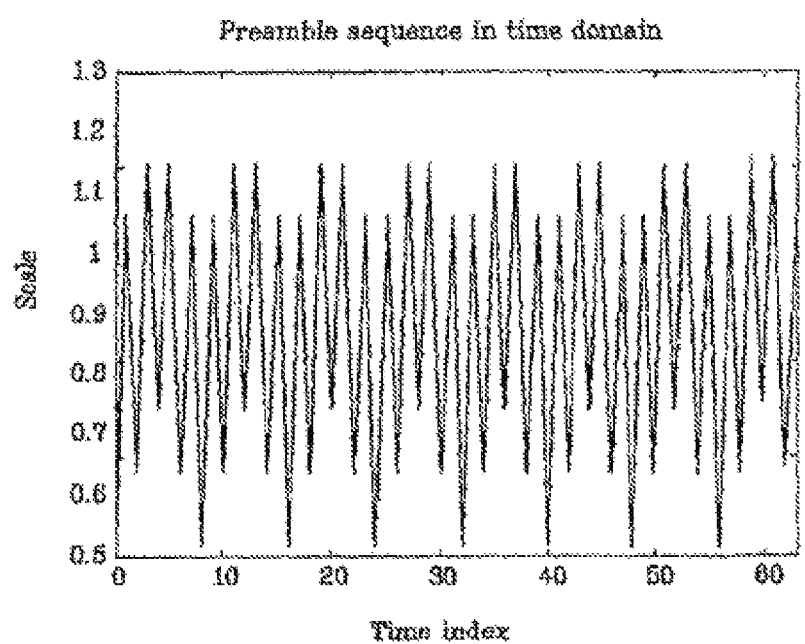
Figure 23A:
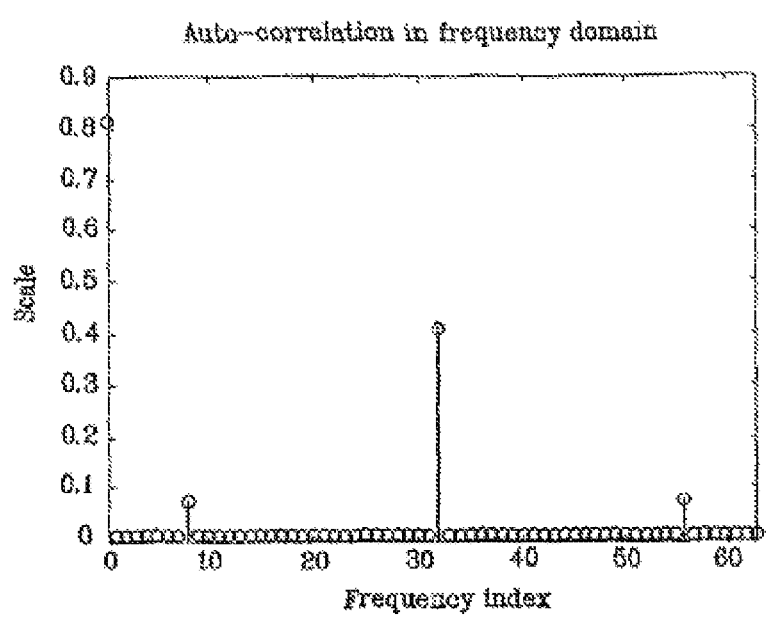
FIG. 23A and FIG. 23B are diagrams of auto-correlation characteristics of a short preamble used by IEEE 802.11a in frequency and time domains, respectively.
Figure 23B:
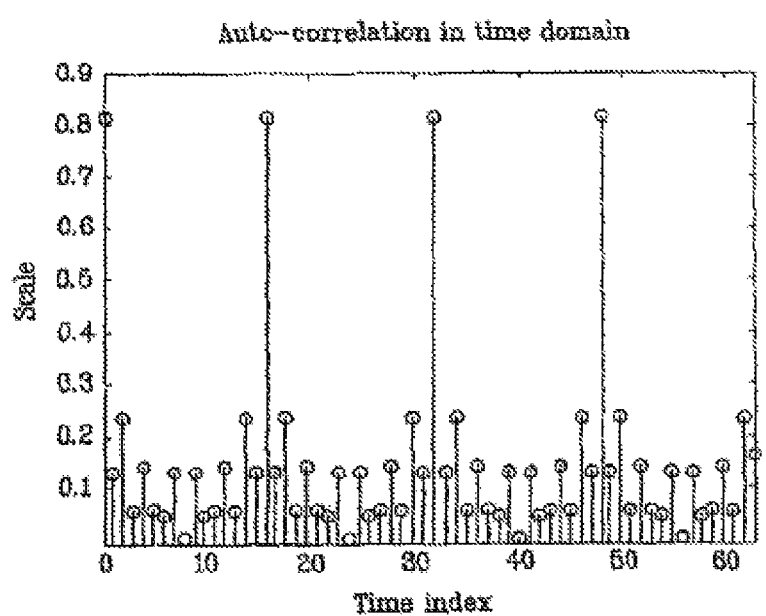

For another instance, in case of OFDM based IEEE 802.11a system, there exists a short preamble used for AGC (automatic gain control), diversity selection, timing synchronization or coarse frequency synchronization. In the short preamble, a specific reference signal is inserted in a subcarrier corresponding to a quadruple number only (4-space interval in frequency domain). A sequence inserted with an equi-spaced interval l in frequency domain appears in time domain in a manner that a same pattern is repeated l times. Such a repetitive pattern facilitates acquisitions of timing synchronization and frequency synchronization. FIG. 22A and FIG. 22B are diagrams of frequency and time domain signals of a short preamble used by IEEE 802.11a, respectively. FIG. 23A and FIG. 23B are diagrams of auto-correlation characteristics of a short preamble used by IEEE 802.11a in frequency and time domains, respectively.

Preferably, there exist a number of sequences having good cross-correlation characteristics for the discrimination of cell or mobile subscriber station (i.e., user equipment) in a mobile communication system. In binary Hardamard codes or polyphase CAZAC (constant amplitude zero auto-correlation) codes, a count of codes maintaining orthogonality as orthogonal codes is limited. For instance, a count of N-length orthogonal codes, which can be converted to N×N Hardamard matrix, is 'N', and a count of N-length orthogonal codes, which can be generated from CAZAC codes, becomes a count of natural numbers that are relatively prime with 'N' and equal to or smaller than 'N'. [David C. Chu, "Polyphase Codes with Good Periodic Correlation Properties", *Information Theory IEEE Transaction on*, vol. 18, issue 4, pp. 531-532, July, 1972]

For instance, in OFDM (orthogonal frequency division multiplexing) system, a length of one OFDM symbol normally has a length of power of 2 for the fast implementations of FFT (Fast Fourier Transform) and IFFT (Inverse Fast Fourier Transform). In this case, if a sequence is generated using Hardamard codes, it is able to generate sequence types corresponding to a total length. If a sequence is generated using CAZAC codes, it is able to generate sequence types corresponding to N/2. So, a count of the sequence types is limited.

Figure 24:
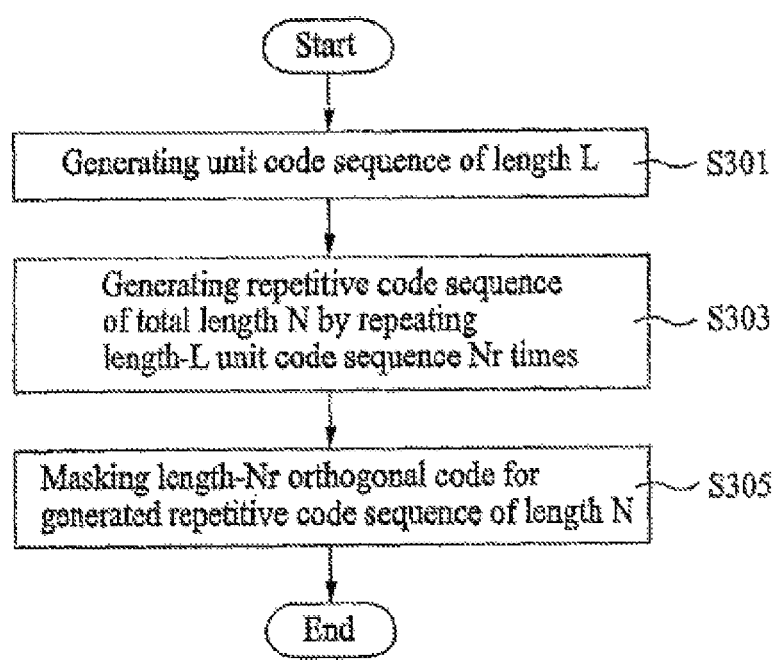
FIG. 24 is a flowchart of a code sequence generating method according to one preferred embodiment of the present invention.

FIG. 24 is a flowchart of a code sequence generating method according to one preferred embodiment of the present invention.

Referring to FIG. 24, a code sequence generating method according to one preferred embodiment of the present invention includes a step S301 of generating a unit code sequence set including a plurality of unit code sequences having a length L each by code generating algorithm according to a code type, a step S302 of generating a repetitive code sequence set including a plurality of repetitive code sequences, which have a total length $N=LN_r$, generated by repeating each of the unit code sequences belonging to the unit code sequence set $N_r$ times, and a step S305 of masking each of the repetitive code sequences belonging to the repetitive code sequence set with an orthogonal code having a length $N_r$.

The unit code sequence set generating step is the step of generating a unit code sequence set $$a_{N_{seq\_L} \times L}$$

having a length L of each unit code sequence and a count $N_{seq\_L}$ of unit code sequences. And, the unit code sequence set $$a_{N_{seq\_L} \times L}$$

can be represented as matrix $N_{seq\_L} \times L$ shown in Formula 12.

$$a_{N_{seq\_L} \times L} = \begin{bmatrix} a^0_{N_{seq\_L} \times L} \\ a^1_{N_{seq\_L} \times L} \\ \vdots \\ a^{N_{seq\_L}-1}_{N_{seq\_L} \times L} \end{bmatrix} \quad \text{[Formula 12]}$$

In Formula 12, $$a^k_{N_{seq\_L} \times L} = [a^k_{N_{seq\_L} \times L}(0) \, a^k_{N_{seq\_L} \times L}(1) \, \ldots \, a^k_{N_{seq\_L} \times L}(L-1)],$$

$$a^k_{N_{seq\_L} \times L}$$

is a row vector indicating a sequence of a $k(=0, 1, 2, \ldots, N_{seq\_L}-1)_{th}$ sequence type index, and $$a^k_{N_{seq\_L} \times L}(l)$$

indicates an $l(=0, 1, 2, \ldots, L-1)_{th}$ element of a $k^{th}$ sequence.

Two cases can be taken into consideration for a method of generating a unit code sequence set having a plurality of unit code sequences each of which length is L. A first case is a method of generating a unit code sequence having a code length L by specific code generating algorithm (first scheme). A second case is a method of generating a unit code sequence having a code length L by generating a code sequence having a length L' (L' is a natural number greater than L.) by specific code generating algorithm and by eliminating (L'−L) elements from elements configuring the generated sequence (second scheme). In case of CAZAC codes, it is preferable that L' is a smallest prime number among natural numbers greater than L.

For the above two cases, a method of generating CAZAC code of L=256 is explained in detail by taking an example as follows.

First of all, in the first scheme, a unit code sequence set $$a_{N_{seq\_L} \times L}$$

including unit code sequences of length L=256 can be generated by CAZAC code generating algorithm represented as Formula 13. [David C. Chu, "Polyphase Codes with Good Periodic Correlation Properties", *Information Theory IEEE Transaction on*, vol. 18, issue 4, pp. 531-532, July, 1972]

$$a^{index(M)}(l) = \begin{cases} \exp\left(i\frac{M\pi l(l+1)}{L}\right), & \text{when } L \text{ is odd} \\ \exp\left(i\frac{M\pi l^2}{L}\right), & \text{when } L \text{ is even} \end{cases} \quad \text{[Formula 13]}$$

where $l=0, 1, 2, \ldots, L-1$

In Formula 13, M includes natural numbers relatively prime with L and $index(M)(=0, 1, 2, \ldots, N_{seq\_L}-1)$ indicates an index in case of aligning the M in an ascending series order. Since L=256 is an even number, a code sequence is generated by the second expression of Formula 13 and a code sequence count $N_{seq\_L}$ becomes $N_{seq\_L}=256/2=128$. And, by the number of M, the code sequence count is determined.

In the second scheme, in order to generate a unit code sequence set including unit code sequences of length L=256, a unit code sequence of L=256 is generated in a manner of generating a code sequence having a length of L'=257 by applying the CAZAC code generating algorithm like Formula 13 to L'=257 that is a smallest prime number among natural numbers greater than L (substituting L' for L in Formula 13) and eliminating an element corresponding to a $256^{th}$ index of the generated code sequence. In this case, as the unit code sequences having the code length of L=256 each can be generated as many as 256 (=257−1), it is able to increment the count of the unit code sequences more than that of the first case.

In FIG. 24, in the repetitive code sequence set generating step S303, a repetitive code sequence set $$a_{N_{seq\_L} \times N}$$

including repetitive code sequences of a total length $N=LN_r$ is generated by repeating each of the unit code sequences belonging to the unit code sequence set generated by the above method $N_r$ times, which can be represented as Formula 14.

$$a_{N_{seq\_L} \times N} = [a^0_{N_{seq\_L} \times L}, \ldots, a^{N_r-1}_{N_{seq\_L} \times L}], \text{ where} \quad \text{[Formula 14]}$$

$$a^0_{N_{seq\_L} \times L} = \ldots = a^{N_r-1}_{N_{seq\_L} \times L}.$$

If a unit code sequence having a code length of L=256 is repeated $N_r=4$ times, a repetitive code sequence having a total code length N=1024 is generated. An auto-correlation characteristic of a repetitive code sequence having a code length N is to have a peak value of $N_r$ times for the length N.

In FIG. 24, the step S305 of masking the repetitive code sequence with the orthogonal code of length $N_r$ is the step of generating a final code sequence set $$a_{N_{seq\_L} \cdot N_{seq\_r} \times N}$$

by masking each repetitive code sequence belonging to a repetitive code sequence set $$a_{N_{seq\_L} \times N}$$

per unit a repeated unit code sequence with different type orthogonal codes $$h_{N_{seq\_r} \times N_r}$$

(e.g., Hardamard codes) having good auto-correlation characteristic and a code length of $N_r$. And, the masking step can be represented as Formula 15.

$$a_{N_{seq\_L} \cdot N_{seq\_r} \times N}^{N_{seq\_L} \cdot r + k}(l) = h_{N_{seq\_r} \times N_r}^{r}\left(\text{floor}\left(\frac{l}{L}\right)\right) \cdot a_{N_{seq\_L} \times N}^{k}(l) \quad \text{[Formula 15]}$$

$$k = 0, 1, \ldots, N_{seq\_L} - 1$$

$$r = 0, 1, \ldots, N_{seq\_r} - 1$$

$$l = 0, 1, \ldots, N - 1$$

In Formula 15, floor(k) indicates an integer closest to a negative infinitive from 'k'.

Figure 25:
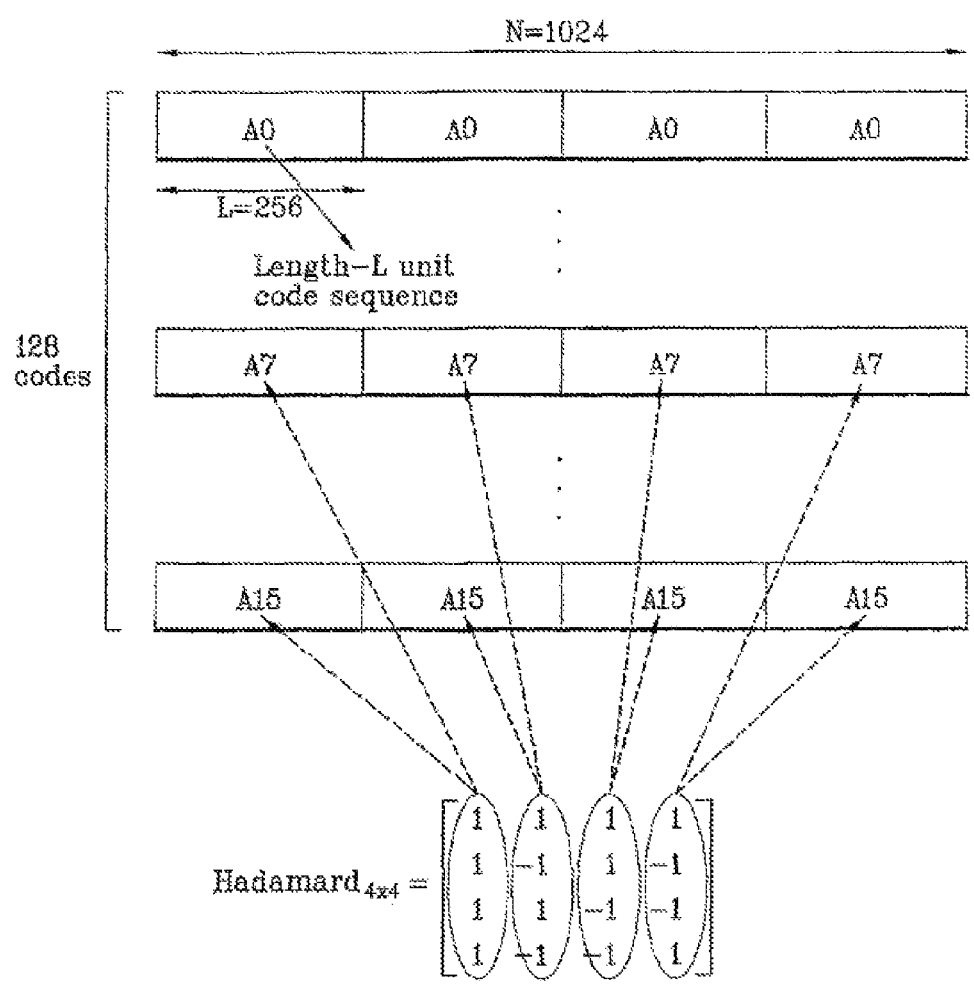
FIG. 25 is a diagram to explain a masking method by Hardamard codes according to one preferred embodiment of the present invention.

FIG. 25 is a diagram to explain a method of generating a final code sequence by masking a repetitive code sequence of a total code length N=1024 generated from repeating a unit code sequence of a code length L=256 $N_r$=4 times with 4×4 Hardamard codes.

Since the unit code sequence of $N_r$=4 is repeated in each repetitive code sequence, if masking is carried on per unit code sequence with Hardamard codes [1 1 1 1], [1 −1 1 −1], [1 1 −1 −1], and [1 −1 −1 1], four different final code sequences are generated for each repetitive code sequence. So, assuming that a repetitive code sequence set includes $N_{seq\_L}$ repetitive code sequences, a finial code sequence set has $N_{seq\_L}$×4 final code sequences.

Figure 26:
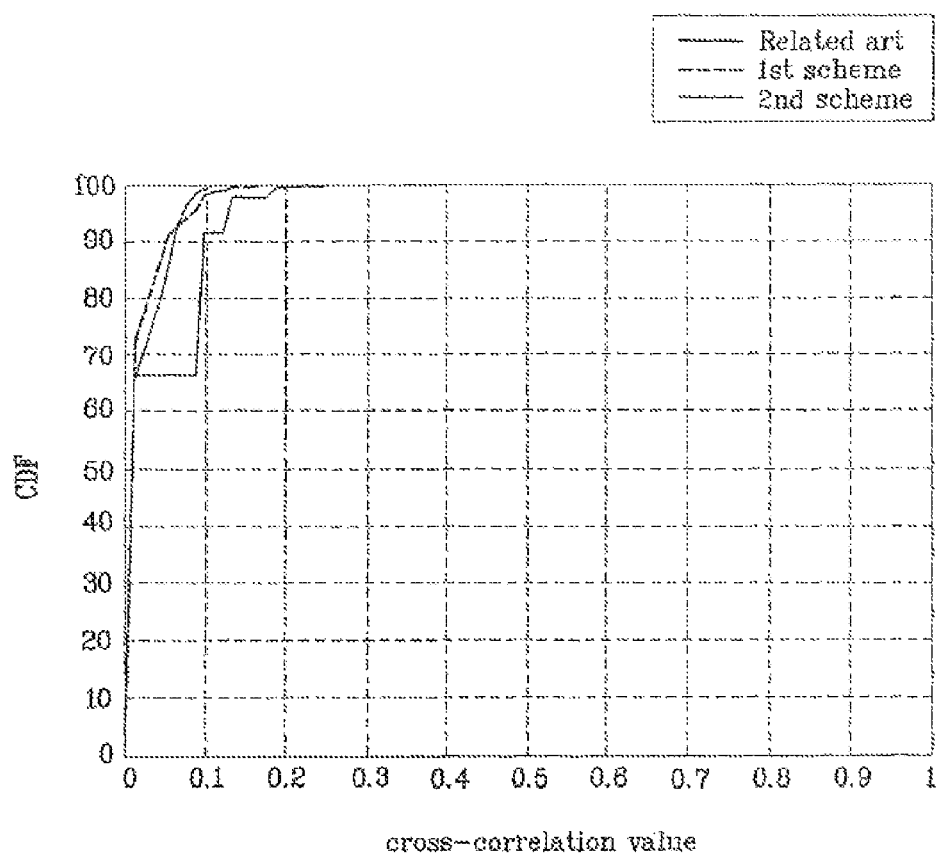
FIGS. 26 to 31 are graphs of performance curves to estimate performance of preferred embodiments of the present invention, respectively.
Figure 27:
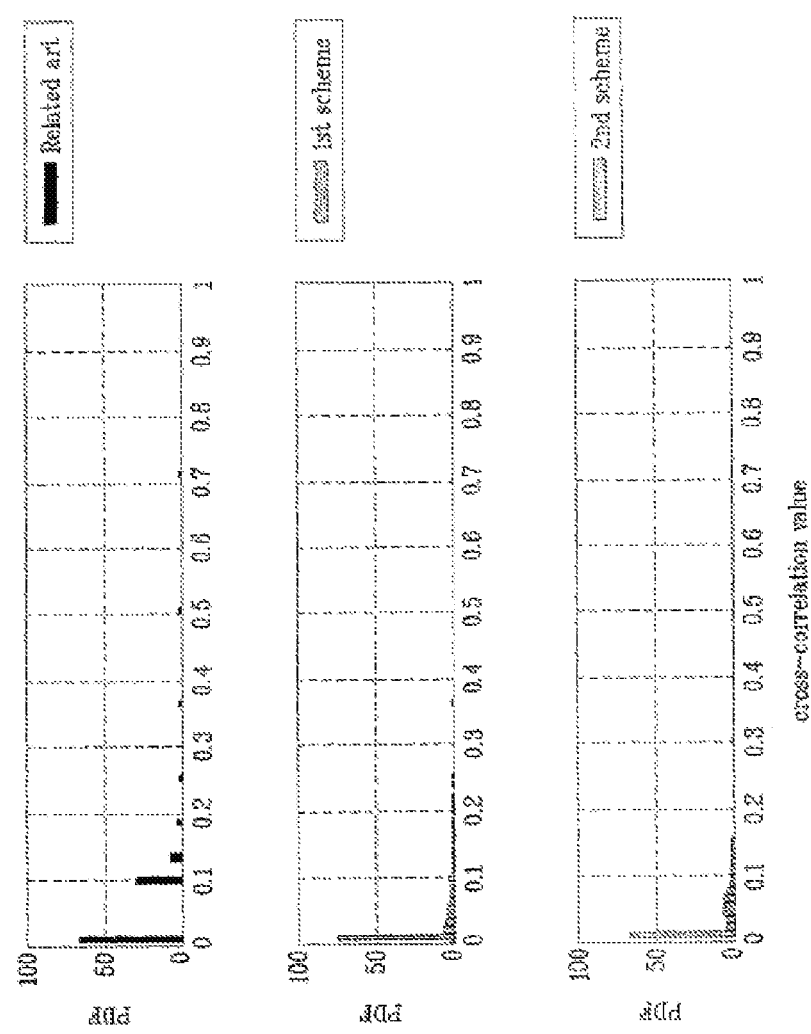

FIG. 26 and FIG. 27 show CDF (cumulative distribution function) and PDF (probability density function) of cross-correlation between a CAZAC code sequence of N=1024 generated by repeating a unit code sequence of length L=256 $N_r$=4 times and a final code sequence generated by making a repetitive code sequence of length N=1024 generated by repeating a unit code sequence of length L=256 generated by the first or second scheme according to one preferred embodiment of the present invention $N_r$=4 times with 4×4 Hardamard codes.

As can be confirmed through FIG. 26 and FIG. 27, the correlation characteristics of the code sequence generated by the method according to one preferred embodiment of the present invention are as good as or better than those of the code sequence according to the related art. Comparing the counts of the finally generated code sequences, the count (128) of the code sequences generated according to the present invention is increased higher than that (first scheme-512, second scheme-1024) of the code sequences generated according to the related art.

Figure 28:
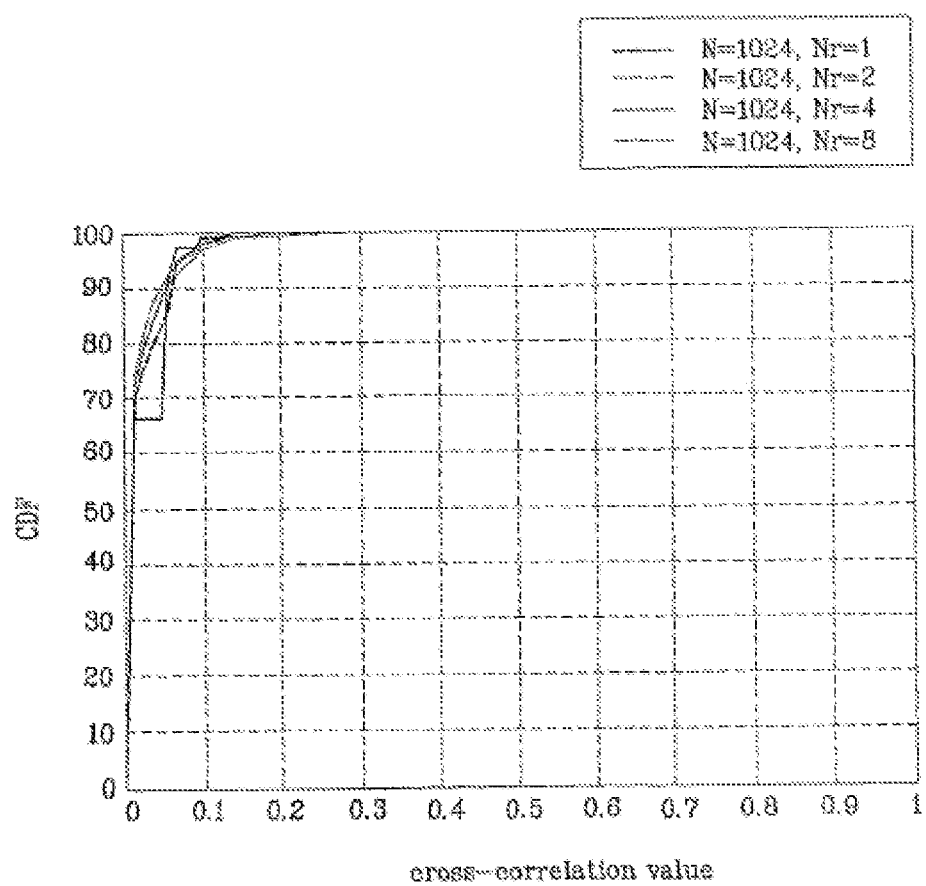
Figure 29:
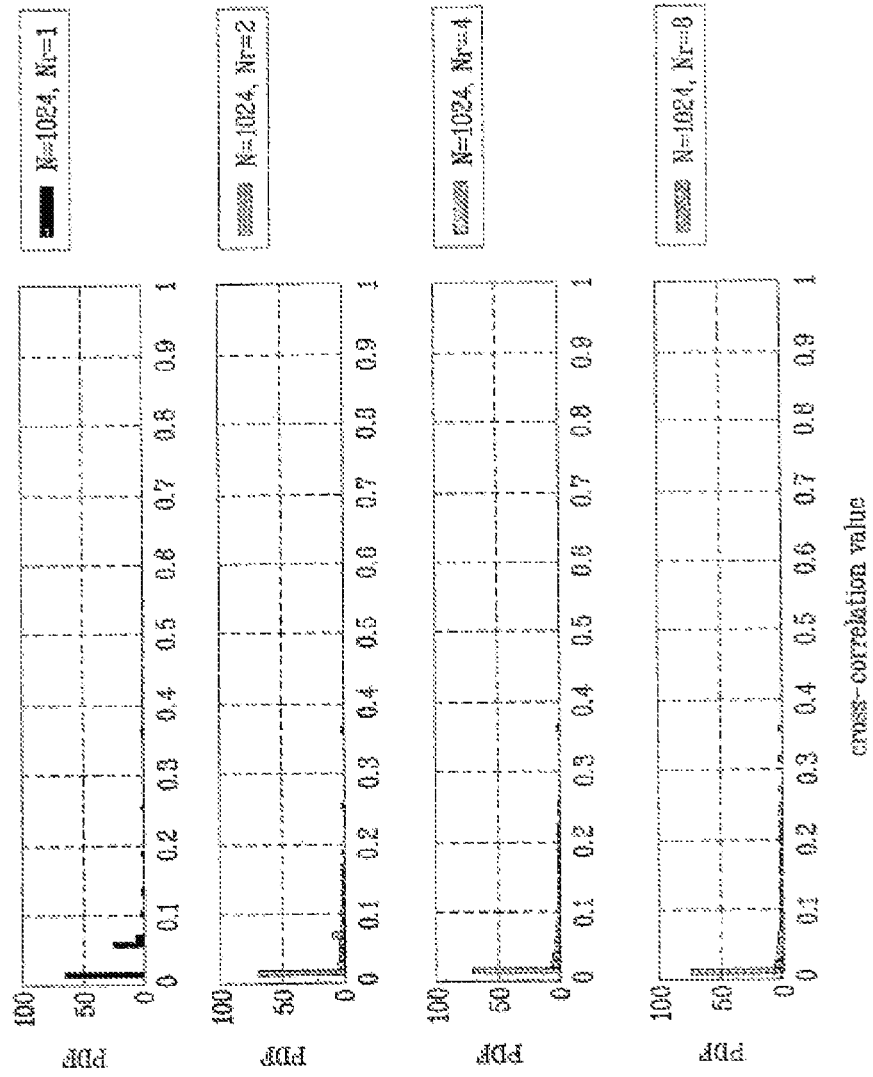

FIG. 28 and FIG. 29 show CDF and PDF of cross-correlation between a repetitive code sequence of length N=1024 generated by repeating a unit code sequence 1, 2, 4, 8 times by the first scheme according to one preferred embodiment of the present invention and a final code sequence generated by masking with Hardamard codes. In this case, a count of final code sequences that can be generated for repetition counts of all cases is 512.

Figure 30:
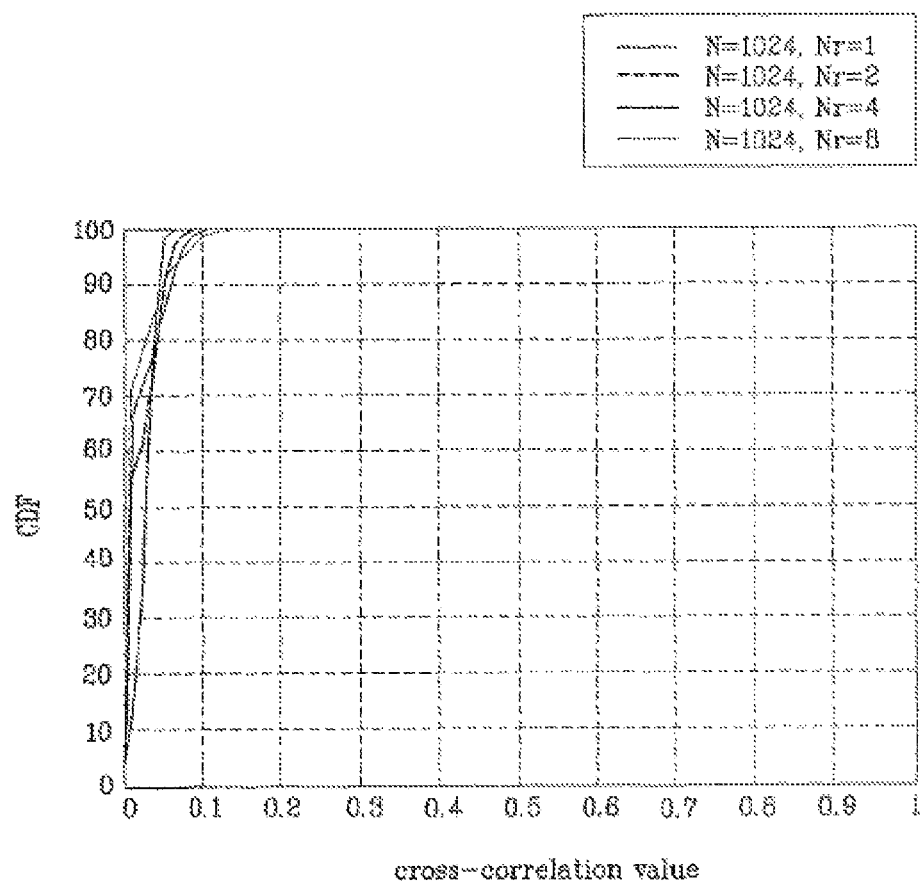
Figure 31:
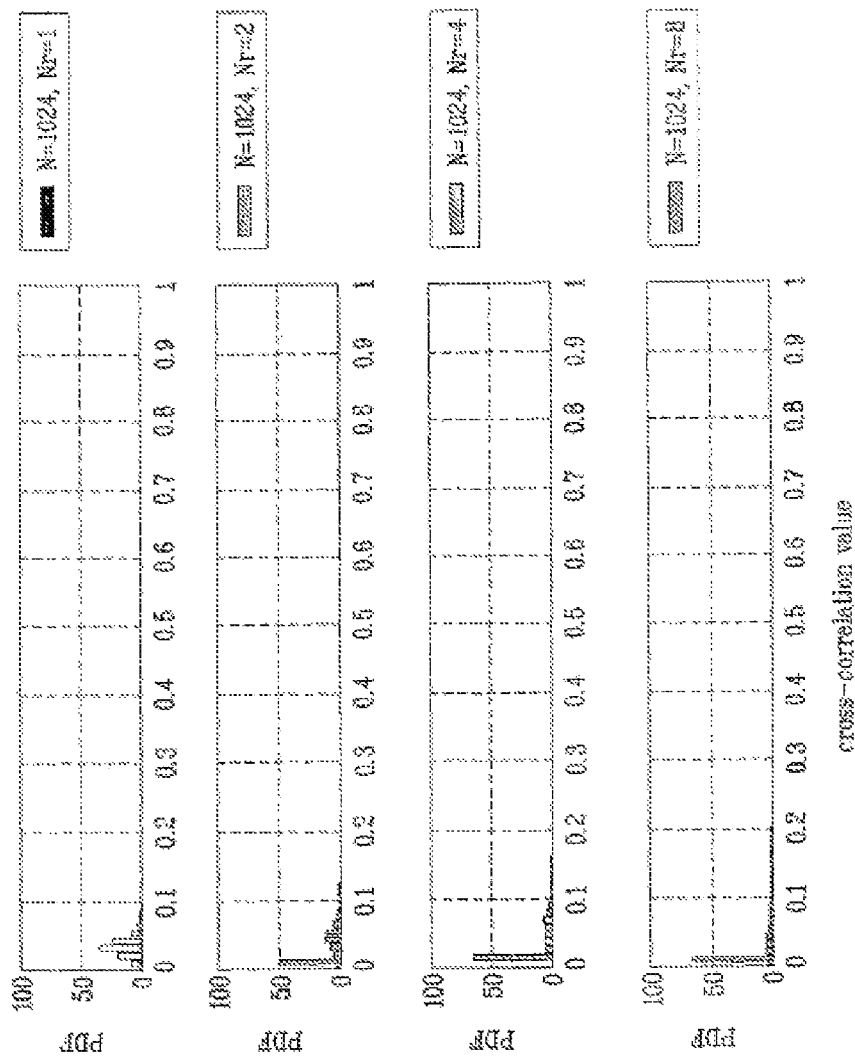

FIG. 30 and FIG. 31 show CDF and PDF of cross-correlation between a repetitive code sequence of length N=1024 generated by repeating a unit code sequence 1, 2, 4, 8 times by the second scheme according to one preferred embodiment of the present invention and a final code sequence generated by masking with Hardamard codes. In this case, a count of final code sequences that can be generated for repetition counts of all cases is 1,030 for a repetition count 1, 1,040 for a repetition count 2, 1,024 for a repetition count 4, or 1,040 for a repetition count 8.

In a communication system requiring a code length N, a code sequence set of a code length N=1024 undergoes data processing into a format requested by the communication system and can be inserted for a use of preamble, pilot signal or the like. As mentioned in the foregoing description, in a sequence inserted with an equi-space l in frequency domain, a same pattern appears in time domain repeatedly l times. A code sequence or code sequence set of the present invention is generated in time domain. So, if the code sequence or code sequence set of the present invention is used by a communication system requiring data processing in time domain, the code sequence generated according to the present invention is used as it is. If the code sequence or code sequence set of the present invention is used by a communication system requiring data processing in frequency domain, the time domain code sequence generated according to the present invention can be used by being transformed into a frequency domain signal by DFT (Discrete Fourier Transform) or FFT (Fast Fourier Transform).

Figure 32:
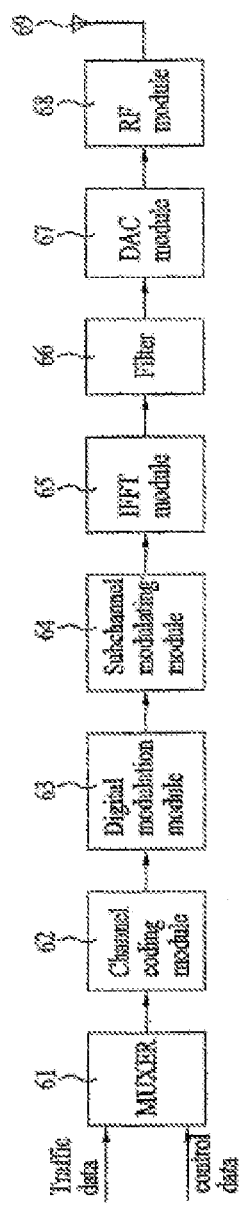
FIG. 32 and FIG. 33 are block diagrams to explain a signal transmitting method and a transmitting apparatus according to one preferred embodiment of the present invention.
Figure 33:
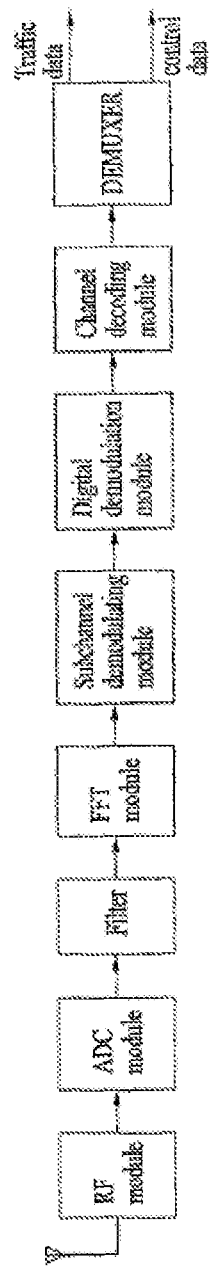

FIG. 32 and FIG. 33 are block diagrams to explain a signal transmitting method and a transmitting apparatus according to one preferred embodiment of the present invention, in which the technical features of the present invention are applied to OFDM/OFDMA/SC-FDMA based radio communication system. FIG. 32 is a block diagram of a transmitter and FIG. 33 is a block diagram of a receiver corresponding to the transmitter shown in FIG. 32.

Referring to FIG. 32, traffic data and control data are inputted and then multiplexed by a muxer 61. In this case, the traffic data is directly associated with a service provided by a transmitting side to a receiving side and the control data indicates data inserted to control the transmitting and receiving sides to perform communications with each other smoothly. A code sequence generated by the above technical features of the present invention is a sort of control data and can be inserted for the use of initial synchronization acquisition, cell search or channel estimation by the receiving side. A position in which the code sequence is inserted may vary according to a communication system. For instance, in IEEE 802.16 broadband wireless access system, the code sequence can be inserted in a form of preamble or pilot signal. In case that a multi-antenna (MIMO) system is applied, it is able to insert the code sequence in a form of midamble.

Input data including the traffic data and the control data undergoes channel coding by a channel coding module 62. Channel coding is a process for adding parity bits to enable the receiving side to correct an error occurring in the course of transmission of a signal transmitted by the transmitting side. And, convolution coding, turbo coding, LDPC (low density parity check) coding or the like can be used for the channel coding.

The data channel-coded by the channel coding module 62 undergoes digital modulation through symbol mapping according to algorithm such as QPSK, 16QAM and the like by a digital modulating module 63.

Data symbols through the symbol mapping undergo subchannel modulation by a subchannel modulating module 74, are mapped to each subcarrier of an OFDM or OFDMA system, and are then transformed into time domain signals according to IFFT conducted by an IFFT module 65.

The IFFT-transformed data symbol undergoes a filtering process by a filter 66, is converted to an analog signal by a DAC module 67m is converted to an RF signal by an RF module 68, and is then transmitted to the receiving side through an antenna 69.

Alternatively, according to a type of a generated code (e.g., CAZAC code), channel coding or symbol mapping of a specific code sequence is omitted. And, the specific code sequence is mapped to a subchannel by the subchannel modulating module 64 and then transmitted through the subsequent data processing steps.

Referring to FIG. 33, a receiver reconstructs the received data through a process reverse to the data processing of the transmitter and then finally obtains the traffic data and the control data.

The configurations of the transmitter and receiver shown in FIG. 32 and FIG. 33 are just exemplary to help the understanding of the technical features of the present invention. And, it is apparent to those skilled in the art that the data processing method for the receiving side to transmit the code sequence for the use of initial synchronization acquisition, cell search or channel estimation can be achieved in various ways known to public.

A code sequence or code sequence set according to the present invention is applicable to a CDMA based wireless mobile communication system by the mobile communication standardization organization such as 3GPP, 3GPP2 and the like or a wireless internet system by Wibro or Wimax in a manner of being transmitted to a receiving side after having been data-processed by a transmitting side according to a system requested by the corresponding system.

INDUSTRIAL APPLICABILITY

Accordingly, the present invention provides the following effects.

First of all, the present invention proposes a method of generating a synchronization channel carrying additional information.

Secondly, information can be provided to a user equipment via the synchronization channel without increasing complexity.

Thirdly, the present invention is able to use the related art synchronization estimating method.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for transmitting a signal in a wireless communication system, the method comprising:
    transmitting a reference signal sequence to a receiving end, wherein: the reference signal sequence is given by repeating a base sequence at least twice and masking the repeated base sequence with an orthogonal code,
    the base sequence is CAZAC (constant amplitude zero auto-correlation) code, and
    the masking the repeated base sequence with the orthogonal code comprises multiplying each base sequence of the repeated base sequence with a corresponding value of the orthogonal code.

2. The method of claim 1, wherein the orthogonal code is Hadamard code.

3. The method of claim 1, wherein the base sequence having a code length of L is generated by eliminating elements of a specific code sequence having a code length of M, the specific code sequence being generated by a code generating algorithm, and
    wherein M is a smallest prime number greater than L, and L and M are natural numbers.

4. The method of claim 3, wherein the code generating algorithm is represented $$a^{index(A)}(n) = \begin{cases} \exp\left(i\frac{A\pi n(n+1)}{M}\right), & \text{when } M \text{ is odd} \\ \exp\left(i\frac{A\pi n^2}{M}\right), & \text{when } M \text{ is even} \end{cases}$$

as where n=0, 1, 2, ..., M−1
    wherein A and M are natural numbers relatively prime, and
    wherein index(A)(=0, 1, 2, ..., $N_{seq\ M}$−1) indicates an index in case of aligning A in an ascending series order.

5. The method of claim 1, wherein the orthogonal code has a length equal to the number of repeating the base sequence.

6. An apparatus for transmitting a signal in a wireless communication system, the apparatus comprising:
    a radio frequency (RF) module configured to transmit a reference signal sequence to a receiving end in the wireless communication system, wherein:
    the reference signal sequence is given by repeating a base sequence at least twice and masking the repeated base sequence with an orthogonal code,
    the base sequence is CAZAC (constant amplitude zero auto-correlation) code, and
    the masking the repeated base sequence with the orthogonal code comprises multiplying each base sequence of the repeated base sequence with a corresponding value of the orthogonal code.

7. The apparatus of claim 6, wherein the orthogonal code is Hadamard code.

8. The apparatus of claim 6, wherein the base sequence having a code length of L is generated by eliminating elements of a specific code sequence having a code length of M, the specific code sequence being generated by a code generating algorithm, and
    wherein M is a smallest prime number greater than L, and L and M are natural numbers.

9. The apparatus of claim 8, wherein the code generating algorithm is $$a^{index(A)}(n) = \begin{cases} \exp\left(i\frac{A\pi n(n+1)}{M}\right), & \text{when } M \text{ is odd} \\ \exp\left(i\frac{A\pi n^2}{M}\right), & \text{when } M \text{ is even} \end{cases}$$

represented as where n=0, 1, 2, ..., M−1
    wherein A and M are natural numbers relatively prime, and
    wherein index(A)(=0, 1, 2, ..., $N_{seq\ M}$−1) indicates an index in case of aligning A in an ascending series order.

10. The apparatus of claim 6, wherein the orthogonal code has a length equal to the number of repeating the base sequence.

* * * * *